(12) United States Patent
Zhou

(10) Patent No.: US 11,483,829 B2
(45) Date of Patent: Oct. 25, 2022

(54) METHOD AND DEVICE FOR TRANSMITTING INFORMATION TO ACHIEVE FLEXIBLE SCHEDULING OF UNLICENSED SPECTRUM RESOURCES IN A LICENSED SPECTRUM, BASE STATION, AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 185 days.

(21) Appl. No.: 16/969,407

(22) PCT Filed: Feb. 13, 2018

(86) PCT No.: PCT/CN2018/076646
§ 371 (c)(1),
(2) Date: Aug. 12, 2020

(87) PCT Pub. No.: WO2019/157630
PCT Pub. Date: Aug. 22, 2019

(65) Prior Publication Data
US 2021/0058927 A1 Feb. 25, 2021

(51) Int. Cl.
*H04L 12/28* (2006.01)
*H04W 72/04* (2009.01)
(Continued)

(52) U.S. Cl.
CPC ....... *H04W 72/0453* (2013.01); *H04W 16/14* (2013.01); *H04W 72/085* (2013.01)

(58) Field of Classification Search
CPC .. H04L 5/001; H04W 16/14; H04W 72/0453; H04W 72/04
(Continued)

(56) References Cited

U.S. PATENT DOCUMENTS 10,993,117 B2 * 4/2021 Pu .................. H04W 72/042
2013/0163543 A1 6/2013 Freda et al.
(Continued)

FOREIGN PATENT DOCUMENTS

CN 102202028 A 9/2011
CN 107071816 A 8/2017
(Continued)

OTHER PUBLICATIONS

Indian Office Action dated Sep. 10, 2021 in Indian Patent Application No. 202047038556, 6 pages.
(Continued)

*Primary Examiner* — John Pezzlo
(74) *Attorney, Agent, or Firm* — Oblon, McClelland, Maier & Neustadt, L.L.P.

(57) ABSTRACT

Provided are a method and device for transmitting information, a base station and user equipment (UE). The method can include determining supplemental system control information for target UE to communicate in an unlicensed spectrum, the supplemental system control information being configured to inform the target UE of configuration information of a supplemental bandwidth part (SBWP) allocated in the unlicensed spectrum. The method can further include sending the supplemental system control information to the target UE through a primary BWP that is allocated in a licensed spectrum by the base station to the target UE, and scheduling the target UE on the primary BWP and the SBWP to perform information transmission. The method for transmitting information provided by the present disclosure may achieve flexible scheduling of unlicensed spectrum resources in a licensed spectrum, as well as improve the configuration flexibility and effective utilization of the unlicensed spectrum resources.

26 Claims, 16 Drawing Sheets

(51) Int. Cl.
*H04W 16/14* (2009.01)
*H04W 72/08* (2009.01)
*H04J 1/16* (2006.01)

(58) Field of Classification Search
USPC .................................. 370/252, 329, 386, 430
See application file for complete search history.

(56) References Cited

U.S. PATENT DOCUMENTS

| | | | |
|---|---|---|---|
| 2016/0227578 A1* | 8/2016 | Lee | H04W 74/004 |
| 2016/0249333 A1 | 8/2016 | Freda et al. | |
| 2017/0195099 A1 | 7/2017 | Kahtava et al. | |
| 2017/0251373 A1 | 8/2017 | Ding et al. | |
| 2019/0029009 A1 | 1/2019 | Freda et al. | |
| 2020/0288410 A1* | 9/2020 | Chang | H04W 52/243 |
| 2020/0374757 A1* | 11/2020 | Ljung | H04W 28/20 |

FOREIGN PATENT DOCUMENTS

| | | |
|---|---|---|
| WO | WO 2015/081838 A1 | 6/2015 |
| WO | WO 2015/185256 A1 | 12/2015 |
| WO | WO 2016/029851 A1 | 3/2016 |
| WO | WO 2016/198734 A1 | 12/2016 |
| WO | WO 2017/199219 A1 | 11/2017 |

OTHER PUBLICATIONS

Extended European Search Report dated Sep. 21, 2021 in European Patent Application No. 18906619.4, 10 pages.
International Search Report dated Nov. 2, 2018 in PCT/CN2018/076646 (submitting English translation only), 2 pages.
Written Opinion of the International Search Authority dated Nov. 2, 2018 in PCT/CN2018/076646 (submitting English translation only), 4 pages.
"High Level Views on NR-U BWP", Sony, 3GPP TSG RAN WG1 Meeting 91, R1-1720475, Nov. 18. 2017, (Nov. 18, 2017), section1-3, pp. 1-4.

* cited by examiner

METHOD AND DEVICE FOR TRANSMITTING INFORMATION TO ACHIEVE FLEXIBLE SCHEDULING OF UNLICENSED SPECTRUM RESOURCES IN A LICENSED SPECTRUM, BASE STATION, AND USER EQUIPMENT

CROSS-REFERENCE TO RELATED APPLICATION

This application is a U.S. national stage of International Patent Application No. PCT/CN2018/076646, filed on Feb. 13, 2018, the content of which is herein incorporated by reference in its entirety.

TECHNICAL FIELD

The present disclosure relates to the technical field of communications, including to a method and device for transmitting information, a base station and user equipment (UE).

BACKGROUND

With the development of wireless communication technology, a mobile communication network is gradually evolving to a 5th Generation (5G) network. Similar to the Long Term Evolution Unlicensed Spectrum (LTE-U) or License Assisted Access (LAA) technology in a 4G LTE system, a technology about how to validly utilize unlicensed spectra, such as 2.4 GHz and 5 GHz, and other wireless resources is also involved in a 5G New Radio (NR) network, which is called an NR Unlicensed (NR-U) technology, that is, it is expected to use 5G NR technologies in an unlicensed spectrum.

The unlicensed spectrum usually has a complex interference environment because it allows the use of various technologies such as Bluetooth and Wi-Fi. In order to prevent the abuse of the unlicensed spectrum, controlled use is generally advocated, for example, the use of the unlicensed spectrum may be controlled by a licensed spectrum. For example, the LAA technology of LTE is implemented by scheduling a component carrier (CC) in the unlicensed spectrum. However, it can be necessary to plan and activate a CC in the unlicensed spectrum, and if it is used in the NR-U technology, the granularity of resource control is relatively coarse in terms of frequency and time, so it is impossible to achieve flexible configuration and effective utilization of unlicensed spectrum resources.

SUMMARY

According to a first aspect of the present disclosure, a method for transmitting information is provided that can be implemented by a base station. The method can include that supplemental system control information is determined for target UE to communicate in an unlicensed spectrum, the supplemental system control information being configured to inform the target UE of configuration information of a supplemental bandwidth part (SBWP) allocated in the unlicensed spectrum. The method can further include that the supplemental system control information is sent to the target UE through a primary bandwidth part (BWP), the primary BWP being a BWP allocated in a licensed spectrum by the base station to the target UE, and the target UE is scheduled on the primary BWP and the SBWP to perform information transmission.

According to a second aspect of the present disclosure, a method for transmitting information is provided that is implemented by UE. The method can include that supplemental system control information is acquired from a primary BWP scheduled by the base station, the primary BWP being a BWP configured in a licensed spectrum by the base station for the UE, and the scheduling information of a SBWP is acquired. The method can further includes that transmission configuration for the SBWP in an unlicensed spectrum is completed according to the supplemental system control information and the scheduling information of the SBWP, and information is sent/received to/from the base station through the primary BWP and the SBWP.

According a third aspect of the present disclosure, a base station is provided, that can include a processor and a memory configured to store instructions executable by the processor. The processor can be configured to determine supplemental system control information for a target UE to communicate in an unlicensed spectrum, the supplemental system control information being configured to inform the target UE of configuration information of a SBWP allocated in the unlicensed spectrum. The processor can be further configured to send the supplemental system control information to the target UE through a primary BWP, the primary BWP being a BWP allocated by the base station to the target UE in a licensed spectrum, and schedule the target UE on the primary BWP and the SBWP to perform information transmission.

According an fourth aspect of the present disclosure, a UE is provided, which can include a processor and a memory configured to store instructions executable by the processor. The processor can be configured to acquire supplemental system control information from a primary BWP scheduled by a base station, the primary BWP being a BWP configured in a licensed spectrum by the base station for the UE, and acquire scheduling information of a SBWP. The processor can be further configured to complete transmission configuration for the SBWP in an unlicensed spectrum according to the supplemental system control information and the scheduling information of the SBWP, and send/receive information to/from the base station through the primary BWP and the SBWP.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DESCRIPTION OF EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The execution bodies involved in the present disclosure can include base stations and UE. The base stations may be base stations, sub-base stations or the like, which are equipped with large-scale antenna arrays. The UE may be user terminals, user nodes, mobile terminals or tablet computers, etc. In a specific implementation process, the base stations and the UE are independent and connected to each other, so as to jointly implement the technical solutions provided by the present disclosure.

Before the technical solutions of the present disclosure are introduced, a 5G NR technology is introduced. 5G NR may be deployed in a high frequency range of 3.3 GHz to 24 GHz, covering unlicensed spectra like 5 GHz. In a 5G network, a bandwidth of a single band may be close to 1 GHz, and a bandwidth of a single carrier may be between 80 MHz and 400 MHz. A single carrier may be divided into multiple BWPs for energy saving of UE of the 5G network. The base station may schedule the UE on one or more BWPs.

The present disclosure provides a method for transmitting information, which is applied to the 5G NR network, and can achieve flexible configuration of unlicensed spectrum transmission resources via a licensed spectrum.

Figure 1:
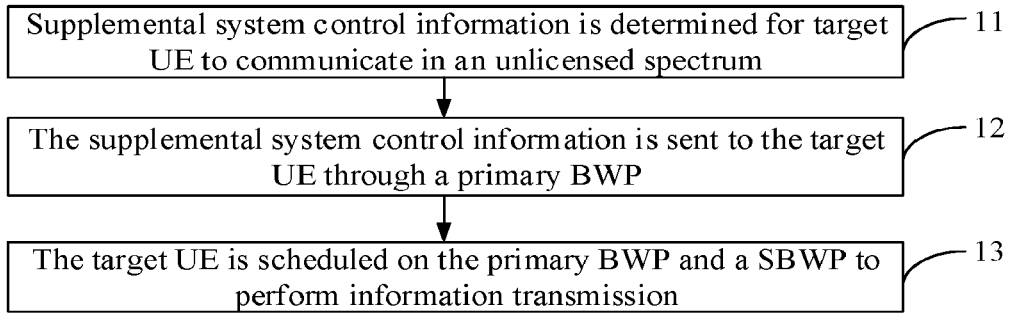
FIG. 1 is a flowchart of a method for transmitting information according to an exemplary embodiment.

FIG. 1 illustrates a flowchart of a method for transmitting information according to an exemplary embodiment. The method is applied to a base station of the 5G NR network, and may include operations as below.

In operation 11, supplemental system control information is determined for target UE to communicate in an unlicensed spectrum. The supplemental system control information is configured to inform the target UE of configuration information of an SBWP allocated in the unlicensed spectrum. In the present disclosure, when allocating a transmission resource for the target UE accessing the network, the base station may allocate both a licensed spectrum transmission resource and an unlicensed spectrum transmission resource for the target UE, and inform, through supplemental system control information like a system information block (SIB), the target UE of configuration information of a SBWP allocated to the target UE in the unlicensed spectrum. The configuration information of the SBWP may include a time-frequency resource range of the SBWP and other information.

In the present disclosure, the BWP allocated by the base station for the target UE in the unlicensed spectrum is called a SBWP. The base station may determine the supplemental system control information according to time-frequency resource information of the SBWP allocated to the target UE.

The supplemental system control information may at least include the time-frequency resource range of the SBWP, so that the target UE can perform transmission configuration of the unlicensed spectrum according to the supplemental system control information, for example, activating a Radio Frequency (RF) transceiver module of the unlicensed spectrum and adjusting an operating frequency range of the RF transceiver module.

In another embodiment of the present disclosure, the supplemental system control information may further include carrier location information of the scheduling information of the SBWP. The carrier location information is configured to inform the target UE of the location of the control information transmission resource from which the scheduling information of the SBWP is parsed. The scheduling information of the SBWP may include uplink and downlink resource allocation information of the SBWP, a modulation and demodulation mode and other control information related to the scheduling of the SBWP. The scheduling information of the SBWP may further include reference signal configuration information and synchronization signal configuration information of the SBWP.

In a situation that the base station prepares to schedule the target UE on multiple SBWPs, the supplemental system control information may further include the number of SBWPs to be scheduled and carrier location information of scheduling information of each SBWP, so that the target UE can quickly and accurately acquire the scheduling information of each SBWP from the control information transmission resources of the primary BWP and/or the SBWPs according to the carrier location information after acquiring the supplemental system control information.

In the present disclosure, according to different manners in which the base station allocates unlicensed spectrum resources for the target UE, the implementation of the operation 11 may at least include the following two situations.

Situation 1 is that, the base station determines the supplemental system control information for the target UE to communicate in the unlicensed spectrum according to a preset SBWP configuration rule. The preset SBWP configuration rule may include any one of following.

The first rule is that, BWP resources are allocated to the target UE on a preset specified channel in the unlicensed spectrum agreed by a system. That is, the system agrees in advance that when it is necessary to allocate the unlicensed spectrum resources for UE, the UE is scheduled on a preset channel in an unlicensed spectrum specified by the system. The supplemental system control information of the target UE may be determined based on a frequency range of the preset specified channel in the unlicensed spectrum. In the embodiments of the present disclosure, the supplemental system control information determined by the base station for the target UE may include information of the preset specified channel in the unlicensed spectrum. The information of the preset specified channel may be either the frequency range of the specified channel or the center frequency or bandwidth of the specified channel, or a channel identifier of the preset specified channel. After acquiring the channel identifier of the specified channel, the target UE may determine the frequency range of the specified channel based on the preset system configuration information, thus reducing a system signaling overhead.

The second rule is that, the BWP resources in the unlicensed spectrum are allocated to the target UE according to a historical scheduling record of the target UE in the unlicensed spectrum. In the embodiments of the present disclosure, the base station may acquire the historical scheduling record of the target UE in the unlicensed spectrum according to a system agreement, and determine, according to the historical scheduling record, the configuration information for allocating the SBWP resource for the target UE presently.

In a case that there are multiple historical scheduling records of the target UE in the unlicensed spectrum recorded in the base station, one or a part of historical scheduling records may also be selected as a reference according to a preset rule. For example, the unlicensed spectrum resources may be allocated to the target UE with reference to the last historical scheduling record; or, statistics may be made for each historical scheduling record, and the unlicensed spectrum resources with the highest frequency may be used as a preferential reference basis. Or, when there is channel quality information recorded in each historical scheduling record, target historical scheduling information with the highest channel quality in the historical scheduling records can determined as the reference scheduling information according to channel quality from high to low. Therefore, the base station can determine the configuration information of the unlicensed spectrum resources presently allocated to the target UE according to the reference information determined under any strategy.

Situation 2 is that, the base station allocates BWP resources in the unlicensed spectrum for the target UE according to valid transmission resources in the unlicensed spectrum monitored in real time.

Considering that multiple technologies are allowed to be used in the unlicensed spectrum, such as Wireless Fidelity (Wi-Fi), Blue tooth, and Ultra Wide Band (UWB), which may inevitably lead to a complex interference environment of the unlicensed spectrum, the base station or the UE is needed to monitor in real time available wireless resources, and determine a time-frequency range of the SBWP to be scheduled and other control information for the target UE with taking an RF support capability of the target UE in the unlicensed spectrum into consideration.

Figure 2:
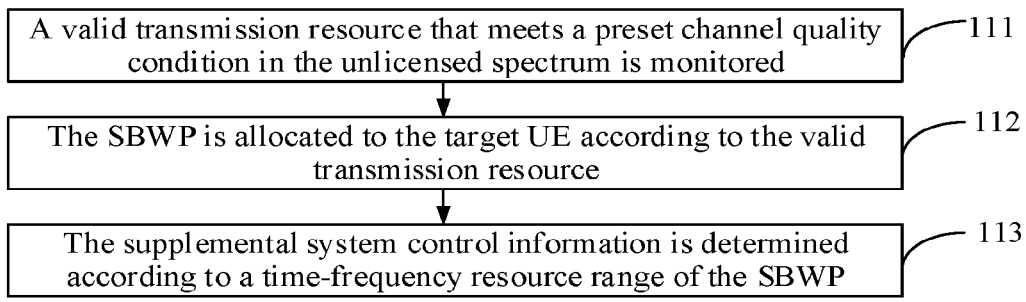
FIG. 2 is a flowchart of another method for transmitting information according to an exemplary embodiment.

Referring to FIG. 2 that illustrates a flowchart of another method for transmitting information, the operation 11 may include following actions.

In operation 111, a valid transmission resource that meets a preset channel quality condition in the unlicensed spectrum is monitored.

In the present disclosure, the base station may monitor the valid transmission resource in the unlicensed spectrum according to any one of the following manners.

First manner is that, the valid transmission resource is monitored according to the RF support capability of the target UE in the unlicensed spectrum.

Figure 3:
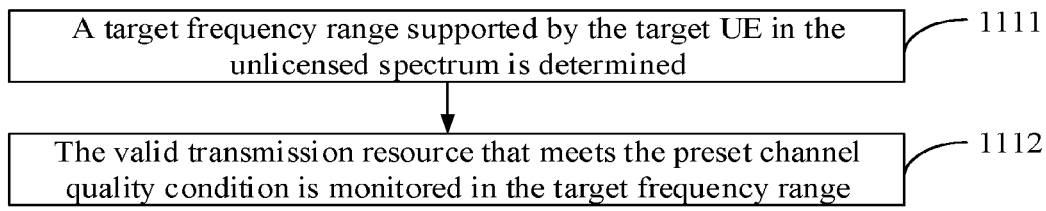
FIG. 3 is a flowchart of another method for transmitting information according to an exemplary embodiment.

FIG. 3 illustrates a flowchart of another method for transmitting information, operation 111 may include the following.

In operation 1111, a target frequency range supported by the target UE in the unlicensed spectrum is determined. In the embodiments of the present disclosure, the base station may determine in advance the RF support capability information of the target UE, including the RF support capability of the UE in the unlicensed spectrum, for example, how many spectra can be supported and what is the frequency range of each spectrum, and thus can the target frequency range supported by the target UE in the unlicensed spectrum. For example, the frequency range that supports the preset bandwidth in a 5G spectrum may be expressed as f1 to f2.

In operation 1112, the valid transmission resource that meets the preset channel quality condition is monitored in the target frequency range. The target frequency range f1 to f2 in the unlicensed spectrum is taken as an example. The base station may acquire, through interoperability of an uplink channel and a downlink channel, the channel quality information of the downlink channel in the target frequency range f1 to f2 of the unlicensed spectrum according to a measurement result of an uplink Sounding Reference Signal (SRS), thus determining the valid transmission resource meeting the preset channel quality condition in the target frequency range f1 to f2.

Or, the base station may send a downlink reference signal to the target UE in the target frequency range f1 to f2. The target UE may measure the downlink reference signal and feedback a measurement result to the base station. The base station may determine, according to the measurement result of the downlink reference signal, the valid transmission resource meeting the preset channel quality condition in the target frequency range f1 to f2.

The operation that the base station monitors the channel quality in the target frequency range may include at least two following situations.

First situation is that, according to the target frequency range of the target UE, the base station may perform monitoring with a preset bandwidth as a unit in the frequency domain based on a preset rule of the system.

Figure 4:
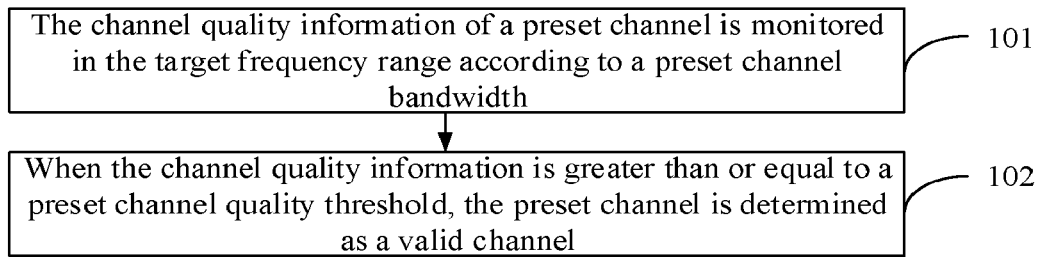
FIG. 4 is a flowchart of another method for transmitting information according to an exemplary embodiment.

FIG. 4 illustrates a flowchart of another method for transmitting information, operation 112 may include the action as below.

In operation 101, the channel quality information of a preset channel is monitored in the target frequency range according to a preset channel bandwidth. In the embodiments of the present disclosure, it is assumed a spectrum bandwidth of the target frequency range f1 to f2 of the target UE is 20M, the base station may monitor, according to a preset channel width like 5M, the channel quality information of each preset channel. The channel quality information may include a signal-to-noise ratio, a Channel Quality Indication (CQI) level, and so on, which can reflect a channel state.

In the embodiments of the present disclosure, the base station may divide, with a preset channel bandwidth like 5M as a unit, the target frequency range f1 to f2 into four preset channels according to a preset channel division rule, for example, according to the order of frequency from high to low or from low to high. The four preset channels may be respectively expressed as a first channel, a second channel, a third channel and a fourth channel. The base station may also determine a channel identifier for each channel.

After acquiring the channel quality information of each preset channel, the base station may record a corresponding relationship among the preset channels, the channel identifiers and the channel quality information through a preset table. Exemplarily, the corresponding relationship is shown in Table 1 as below.

TABLE 1

| Preset channel | Channel identifier | Channel quality information |
|---|---|---|
| First channel | 1 | First CQI |
| Second channel | 2 | Second CQI |
| Third channel | 3 | Third CQI |
| Fourth channel | 4 | Fourth CQI |

In Table 1, the CQI level represents the channel quality information of each preset channel.

In operation 102, when the channel quality information is greater than or equal to a preset channel quality threshold, the preset channel is determined as a valid channel. In the embodiments of the present disclosure, after acquiring the channel quality information of each preset channel like the CQI level, the base station may compare the acquired channel quality information with the preset channel quality threshold. When the channel quality information of a preset channel is lower than the preset channel quality threshold, the preset channel may be determined as an invalid channel. That is, there is severe signal interference in the frequency range of the preset channel, and it is not suitable to schedule the target UE on the resources of the preset channel. On the contrary, when the channel quality information of a preset channel is greater than or equal to the preset channel quality threshold, the preset channel can be determined as a valid channel, that is, the target UE can be scheduled on the preset channel because there is less interference in the frequency range of the preset channel.

In the embodiments of the present disclosure, the bandwidth, for example 5M, of the valid resources determined by the base station for the target UE in the unlicensed spectrum may be configured by the system in advance. When sending the supplemental system control information to the target UE later, the base station can only inform the target UE of the channel identifier of the valid channel without need of informing the target UE of the specific frequency range of the valid channel, thus reducing the signaling overhead and saving the control information transmission resource.

Second situation is that, when monitoring the channel quality for the target frequency range f1 to f2, the base station may monitor the channel quality for the target frequency range f1 to f2 through smaller sampling granularity to accurately determine the time-frequency range of the valid transmission resource.

Still taking the target frequency range f1 to f2 with the bandwidth of 20M as an example. A finer reference signal sampling interval may be adopted for sampling, for example, sampling at intervals of 1M in a frequency domain and 25 ms in a time domain, thus accurately determining the valid transmission resource, such as a frequency range at intervals of 1M.

Second manner is that, the base station may perform full-spectrum monitoring in the unlicensed spectrum to determine whether there is a valid transmission resource available.

Figure 5:
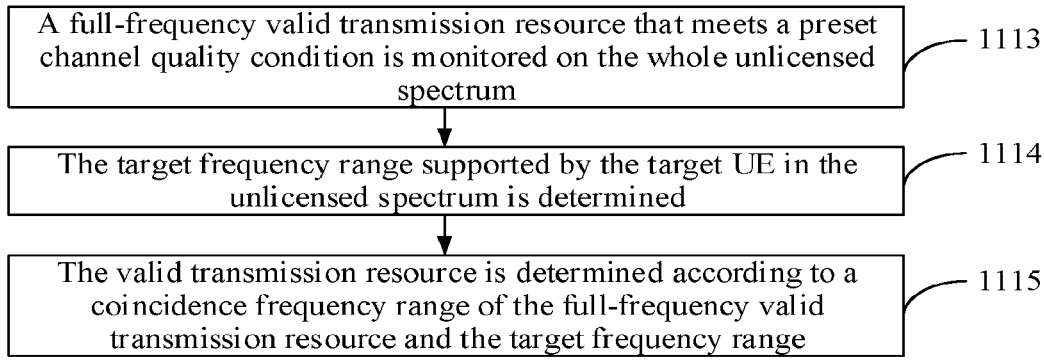
FIG. 5 is a flowchart of another method for transmitting information according to an exemplary embodiment.

FIG. 5 illustrates a flowchart of another method for transmitting information, operation 111 may include the actions as below.

In operation 1113, a full-frequency valid transmission resource that meets the preset channel quality condition is monitored on the whole unlicensed spectrum. The unlicensed spectrum of 5 GHz is taken as an example. The base station may send a downlink reference signal to all UE in a signal coverage of the base station within a full frequency range of the unlicensed spectrum, such as 5000 MHz to 5999 MHz. Each UE may measure the downlink reference signal and feedback a measurement result to the base station. Then, the base station may determine, based on the measurement result of the downlink reference signal, which transmission resources of the unlicensed spectrum can be utilized in the full frequency range. The measurement result of the downlink reference signal that the UE feeds back to the base station may be either original measurement data of the downlink reference signal or channel quality information. The channel quality information may include CQI information, signal-to-noise ratio and the like, which is calculated by the UE according to the measurement result of the downlink reference signal.

Similarly, the base station may also acquire, in the full frequency range of the unlicensed spectrum, the channel quality information of the downlink channel according to a measurement result of an uplink SRS, thus determining the full-frequency valid transmission resource that meets the preset channel quality condition in the full frequency range of the unlicensed spectrum.

In operation 1114, the target frequency range supported by the target UE in the unlicensed spectrum is determined. Similarly, the base station may determine the target frequency range, for example, f1 to f2, in the unlicensed spectrum according to the acquired RF support capability of the target UE in the unlicensed spectrum.

In operation 1115, the valid transmission resource is determined according to a coincidence frequency range of the full-frequency valid transmission resource and the target frequency range.

In the embodiments of the present disclosure, the base station may monitor a valid transmission resource in the full frequency range of the unlicensed spectrum. When the target UE requests a resource allocation, the base station may match in real time the valid transmission resource determined in the full frequency range of the unlicensed spectrum with that in the target frequency range, take an overlapping part between the target frequency range of the target UE and the frequency range of the full-frequency valid resource as the frequency range of the valid transmission resource, and determine time domain information of the full-frequency valid resource as the time domain information of the valid transmission resource, thereby quickly determining the valid transmission resource in the unlicensed spectrum that can be allocated to the target UE. In such a manner, a valid transmission resource in the unlicensed spectrum can be monitored according to the target frequency range supported by the target UE without need of receiving a request, thus reducing a monitoring latency and a resource configuration latency, and improving the effective utilization of the resources in the unlicensed spectrum.

In operation 112, the SBWP is allocated to the target UE according to the valid transmission resource. In the present disclosure, the implementation of operation 112 may at least include the following two modes.

First implementation mode is that, the system allocates by default the SBWP to the target UE after the valid transmission resource is detected, or the base station has determined, according to preset reference information, to allocate the SBWP for the target UE. In such an implementation mode, the base station may directly allocate the SBWP for the target UE after determining the valid transmission resource for the target UE with taking the RF support capability, namely the target frequency range, of the target UE in the unlicensed spectrum into consideration.

In the present disclosure, the base station may allocate one or more SBWPs for the target UE based on the valid transmission resource.

Second implementation mode is that, after determining the valid transmission resource for the target UE and before allocating the SBWP for the target UE, in order to avoid wasting the valid transmission resource of the unlicensed spectrum, the base station may first determine according to the preset reference information whether it is needed to allocate a SBWP for the target UE.

Figure 6:
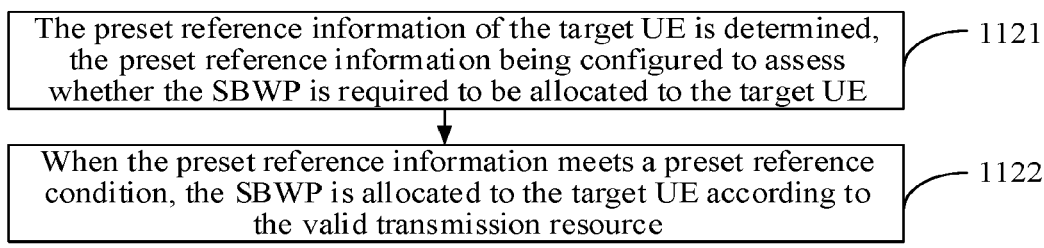
FIG. 6 is a flowchart of another method for transmitting information according to an exemplary embodiment.

Referring to FIG. 6 that illustrates a flowchart of another method for transmitting information, operation 112 may include actions below.

In operation 1121, the preset reference information of the target UE is determined and the preset reference information is configured to assess whether the SBWP is required to be allocated to the target UE. In an embodiment of the present disclosure, the preset reference information may include at least one of followings: a volume of services to be transmitted, types of services to be transmitted, or power consumption state information of the target UE.

The base station may determine the volume of services to be transmitted of the target UE according to a downlink buffer service volume for the target UE and a Buffer Status Report (BSR) sent from the target UE.

In another embodiment of the present disclosure, the base station may also determine the types of the services to be transmitted. In the 5G NR system, the types of the service transmitted may include: an enhanced Mobile Broad Band (eMBB) service, a massive Machine Type Communication (eMTC) service, an Ultra Reliable Low Latency Communication (URLLC) service, and the like. The types of the services to be transmitted may include one or more of the above types.

In another embodiment of the present disclosure, the base station may also acquire the power consumption state information of the target UE. The power consumption state information may represent the present power consumption of the target UE. The power consumption state information may include present heat information of the UE, a transmission power of the UE, consumed electric quantity or present remaining electric quantity of the UE and the like, or a physical quantity related to power consumption which is synthetically determined according to the power consumption state information.

In operation 1122, in response to that the preset reference information meets a preset reference condition, the SBWP is allocated to the target UE according to the valid transmission resource.

In the embodiments of the embodiments of the present disclosure, the preset reference conditions may be conditions for determining whether the SBWP is required to be allocated to the target UE based on the preset reference information. Exemplarily, corresponding to the preset reference information, the preset reference conditions may include at least one of the following conditions.

First condition is that, the volume of services to be transmitted exceeds a preset service volume threshold.

Second condition is that, the types of the services to be transmitted include a preset service type. The preset service type may be a broadband service like an eMBB service.

Third condition is that, the power consumption state information of the target UE does not exceed a preset power consumption threshold. It is assumed that the preset reference condition includes the first condition only, the implementation process of operation 1122 may be that: the volume of services to be transmitted W1 of the target UE, determined by the base station, is compared with the preset service volume threshold W0; when W1 is greater than or equal to W0, it can be determined that the SBWP is to be allocated to the target UE; otherwise, when W1 is less than W0, it is determined that the SBWP is not to be allocated to the target UE, so as to ensure the reliability of service transmission.

Similarly, it is assumed that the preset reference condition only includes the second condition, the implementation process of operation 1122 may be that: the base station determines the types of the services to be transmitted by the target UE; when the types of the services to be transmitted include a preset service type like the eMBB service, it can be determined that the SBWP is to be allocated to the target UE; otherwise, when the types of the services to be transmitted does not include the preset service type, it can be determined that the SBWP is not to be allocated to the target UE.

Similarly, it is assumed that the preset reference condition only includes the third condition, the implementation process of operation 1122 may be that: after acquiring the power consumption state information like the present consumed electric quantity P1 of the target UE, the base station compares it with the preset power consumption threshold P0; when P1 is greater than or equal to P0, considering that using the SBWP in the unlicensed spectrum to transmit information needs the UE to consume more energy, it may be determined that the SBWP is not to be allocated to the target UE in order to ensure the working time of the target UE, so as to avoid more power consumption when the remaining power of the target UE is insufficient, and then ensure that the target UE can last longer; otherwise, when P1 is less than P0, it can be determined that the SBWP is to be allocated to the target UE, that is, when it is determined that the target UE has enough remaining power, the target UE is allowed to transmit information on both the primary BWP of the licensed spectrum and the SBWP of the unlicensed spectrum to speed up the information transmission.

When the preset reference condition includes multiple conditions, for example, including both the first condition and the third condition, in an embodiment of the present disclosure, it is allowed to first compare the total volume of services to be transmitted with the preset service volume threshold, and if it is determined that the total service volume is greater than the preset service volume threshold, then the types of the services to be transmitted may be determined; when the types include the preset service type, it may be determined that the SBWP of the unlicensed spectrum is to be allocated to the target UE.

In another embodiment of the present disclosure, the base station may also first determine whether the types of the services to be transmitted include the preset service type, and in response to that determining that the preset service type is included, may further determine whether the volume of services to be transmitted corresponding to the preset service type exceeds the preset service volume threshold. When the volume of services to be transmitted corresponding to the preset service type exceeds the preset service volume threshold, it may be determined that the SBWP of the unlicensed spectrum is to be allocated to the target UE.

It is to be understood that the preset reference information and the corresponding preset reference conditions may include, but not limited to, the above information, and the illustration of the above embodiments shall not be construed as a limit on the technical solutions of the present disclosure.

In another embodiment of the present disclosure, operation 1121 and operation 1122 may also be performed before operation 111 or operation 11, that is, whether the SBWP of the unlicensed spectrum needs to be allocated to the target UE is determined, and then the valid transmission resource in the unlicensed spectrum is monitored after it is determined that the SBWP of unauthorized frequency band needs to be allocated to target UE, so as to prevent the base station from performing unnecessary monitoring, which saves power consumption and signaling overhead of the base station.

Figure 7:
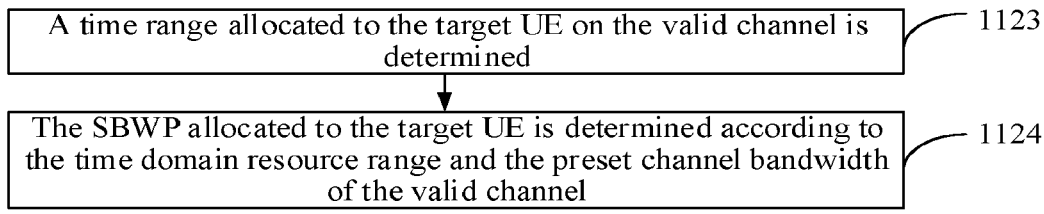
FIG. 7 is a flowchart of another method for transmitting information according to an exemplary embodiment.

In another embodiment of the present disclosure, corresponding to the first situation shown in FIG. 4, FIG. 7 illustrates a flowchart of another method for transmitting information according to an exemplary embodiment, operation 112 may include actions below.

In operation 1123, a time range allocated to the target UE on the valid channel is determined. It is assumed that the base station determines after judgment that the first channel in Table 1 is the valid channel, the base station then may allocate a time domain resource to the target UE on the valid channel according to a preset rule, for example, based on the preset reference information, and acquire information of the time domain resource range. The information of the time domain resource range may be expressed as two specific time endpoints, or one specific time endpoint and a preset duration.

In operation 1124, the SBWP allocated to the target UE is determined according to the time domain resource range and the preset channel bandwidth of the valid channel. After determining the time domain resource range allocated to the target UE on the valid channel, the base station may determine, with taking the preset channel bandwidth like 5M of the valid channel into consideration, the time-frequency resource range of the SBWP allocated to the target UE on the valid channel like the first channel. Exemplarily, the time-frequency resource range may be expressed as (t1–t2; f1–f1+5M). The t1–t2 represents the time domain resource range of the SBWP, f1–f1+5M represents a frequency domain resource range of the SBWP, and f1 represents the minimum boundary frequency point of the valid channel.

In operation 113, the supplemental system control information is determined according to the time-frequency resource range of the SBWP. In the present disclosure, in a situation that the base station allocates multiple SBWPs to the target UE, the time-frequency resource range determined by the base station may include time-frequency range information of each SBWP. The time-frequency range information of each SBWP may be expressed as a specific time-frequency resource range, as illustrated in the second situation. The time-frequency range information of each SBWP may be expressed as a preset channel identifier and time domain range information, for example, corresponding to the example in operation 1124, and transmission configuration information of the SBWP may include a preset channel identifier and a time domain resource range, like (1; t1 to t2).

Figure 8:
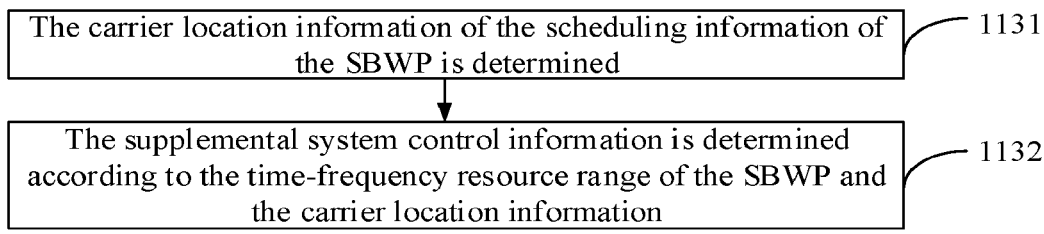
FIG. 8 is a flowchart of another method for transmitting information according to an exemplary embodiment.

FIG. 8 illustrates a flowchart of another method for transmitting information, operation 113 may include actions as below.

In operation 1131, carrier location information of the scheduling information of the SBWP is determined. In the present disclosure, before determining the scheduling information of the SBWP, the base station may first determine a location of a control information transmission resource for carrying the scheduling information of the SBWP, namely the carrier location information of the scheduling information of the SBWP.

In the present disclosure, the carrier location information of the scheduling information of the SBWP may be a set location of the scheduling information of the SBWP in the primary BWP or a set location of the scheduling information of the SBWP in the SBWP, or a set location of a part of the scheduling information of the SBWP in the primary BWP and a set location of the rest scheduling information of the SBWP in the SBWP.

In another embodiment of the present disclosure, it is assumed that the base station allocates multiple SBWPs to the target UE, carrier location information of the scheduling information of each SBWP may be determined, so that the target UE can quickly acquire the scheduling information of each SBWP according to the carrier location information.

In operation 1132, the supplemental system control information is determined according to the time-frequency resource range of the SBWP and the carrier location information. In the present disclosure, after allocating the SBWP to the target UE, the base station may further determine the set location of the scheduling information of the SBWP in the control information transmission resource of the primary BWP, namely the carrier location information of the scheduling information of the SBWP. The supplemental system control information related to the SBWP may be generated according to the time-frequency resource range of the SBWP and the carrier location information of the scheduling information of the SBWP.

In the embodiments of the present disclosure, the supplemental system control information may also be configured to inform the target UE of where to search for the scheduling information of the SBWP, so that the target UE can quickly acquire the scheduling information of the SBWP according to the carrier location information, thus ensuring that the target UE can fully parse the scheduling information of the SBWP, and avoiding downlink information sent by the base station on the SBWP from being lost due to the latency caused by parsing the scheduling information.

In operation 12, the supplemental system control information is sent to the target UE through the primary BWP. As mentioned above, in the present disclosure, the BWP allocated to the target UE by the base station in the licensed spectrum is called a primary BWP.

In an embodiment of the present disclosure, when scheduling the primary BWP, the base station may set the supplemental system control information about the SBWP into the control information transmission resource and send the scheduling information to the target UE. The control information transmission resource in the primary BWP may be a Control Resource Set (CORESET) of the primary BWP.

Figure 9A:
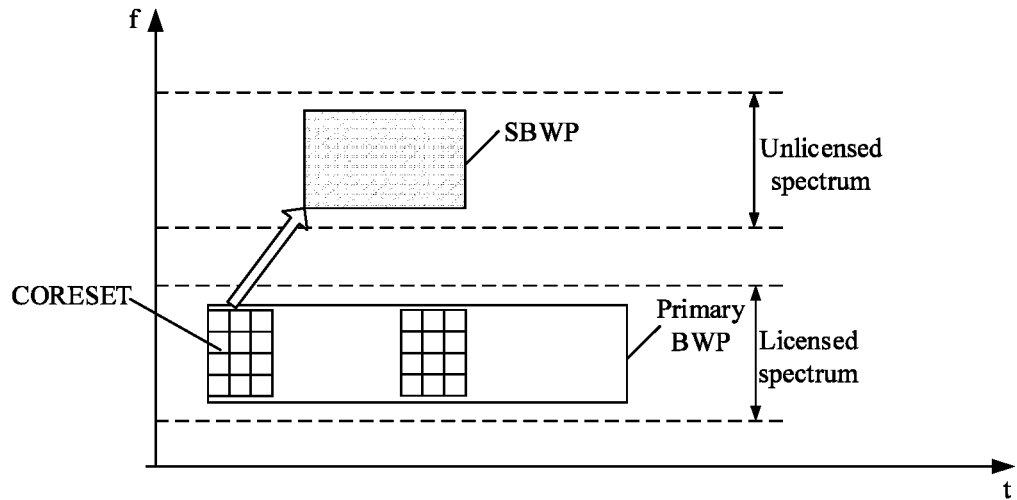
FIG. 9A is a schematic diagram of an application scenario of information transmission according to an exemplary embodiment.

FIG. 9A illustrates a schematic diagram of an application scenario of information transmission according to an exemplary embodiment. There are transmission resources for carrying control information, namely the control information transmission resource, which is set in the primary BWP, for example, the CORESET that is set in a head location of the primary BWP according to a preset rule. In the related art, the CORESET is configured to carry Downlink Control Information (DCI) of the primary BWP, including system control information like SIB and the scheduling information of the primary BWP. In the present disclosure, considering the complex channel environment of the SBWP, the base station may set the supplemental system control information about the SBWP into the control information transmission resource of the primary BWP, so as to realize the control from the base station to the use of and flexible configuration of the unlicensed spectrum resources.

Figure 9B:
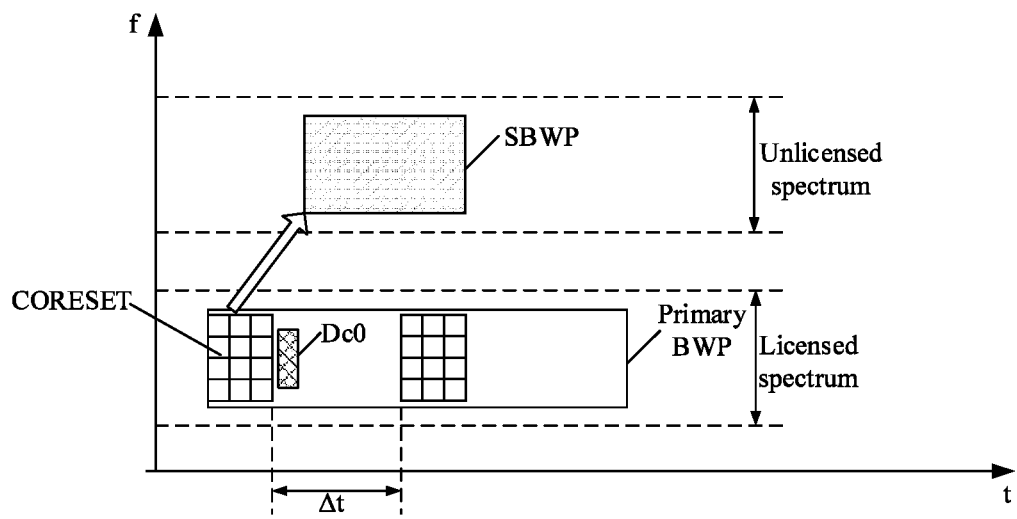
FIG. 9B is a schematic diagram of another application scenario of information transmission according to an exemplary embodiment.

FIG. 9B illustrates a schematic diagram of another application scenario of information transmission according to an exemplary embodiment. In another embodiment of the present disclosure, when the CORESET resource of the primary BWP is not enough to carry all the supplemental system control information, the base station may also set a part of the supplemental system control information, for example, the time-frequency resource range of the SBWP, into the CORESET of the primary BWP, and send the carrier location information to the target UE through the control information transmission resource Dc0 embedded in data transmission resources of the primary BWP. The Δt in the figure represents the time domain range corresponding to the data transmission resources of one primary BWP.

In operation 13, the target UE is scheduled on the primary BWP and the SBWP to perform information transmission.

Figure 10:
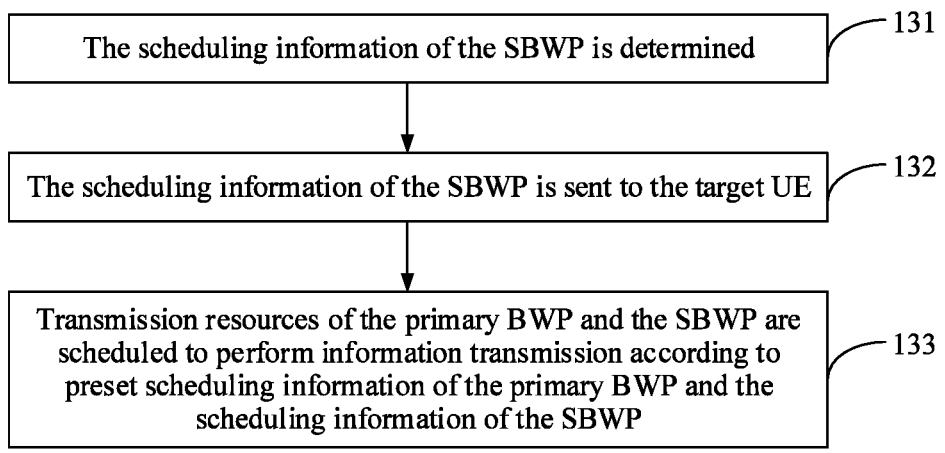
FIG. 10 is a flowchart of another method for transmitting information according to an exemplary embodiment.

FIG. 10 illustrates another method for transmitting information according to an exemplary embodiment, operation 13 may include actions below.

In operation 131, the scheduling information of the SBWP is determined, the scheduling information is configured to inform the target UE of the configuration information of the uplink and downlink transmission resources in the SBWP.

In the present disclosure, after determining the time-frequency resource range of the SBWP, the base station may further determine the scheduling information of the SBWP. The scheduling information of the SBWP may include configuration information of the uplink and downlink transmission resources, a modulation and demodulation mode, configurations of a reference signal and a synchronization signal, etc. The configuration information of the uplink and downlink transmission resources may include the duration, quantity or configuration relationship of an uplink information transmission unit and a downlink information transmission unit.

In operation 132, the scheduling information of the SBWP is sent to the target UE. In the present disclosure, the base station may send the scheduling information of the SBWP to the target UE according to at least one of the following manners.

First manner is that, the scheduling information of the SBWP is set into the control information transmission resource of the primary BWP, and is sent to the target UE through the primary BWP.

Taking that the control information transmission resource is the CORESET of the primary BWP as an example. In the embodiments of the present disclosure, the base station may simultaneously send the supplemental system control information and the scheduling information of the SBWP to the target UE through the CORESET of the primary BWP, as shown in FIG. 9A. In a case that the CORESET of the primary BWP is not enough to carry the supplemental control information and the scheduling information of the SBWP, a part of information such as the scheduling information of the SBWP may be sent to the target UE through the control information transmission resource Dc0 embedded in the data transmission resources in the primary BWP, as shown in FIG. 9B.

Correspondingly, the SBWP shown in FIG. 9A or FIG. 9B may only include the data transmission resources, and may further include the configuration information of the reference signal and the synchronization signal.

Second manner is that, the scheduling information of the SBWP is set into a supplemental control information transmission resource of the SBWP, and is sent to the target UE through the SBWP.

In the embodiments of the present disclosure, a small amount of control information transmission resources may also be set in the SBWP. In the present disclosure, the control information transmission resources that are set in the SBWP may be called the supplemental control information transmission resources. After informing the target UE of the carrier location information of the scheduling information of the SBWP, the base station may load the scheduling information of the SBWP into the supplemental CORESET of the SBWP according to the carrier location information, and send the scheduling information to the target UE through the SBWP. Please refer to FIG. 9C that illustrates a schematic diagram of another application scenario of information transmission according to an exemplary embodiment. Corspondingly, after acquiring the carrier location information of the scheduling information of the SBWP from the supplemental system control information, the target UE can the supplemental CORESET of the SBWP to obtain the scheduling information of the SBWP according to the carrier location information.

Third manner is that, a part of the scheduling information of the SBWP is transmitted through the primary BWP, and the rest scheduling information may be transmitted to the target UE through the SBWP.

Figure 9C:
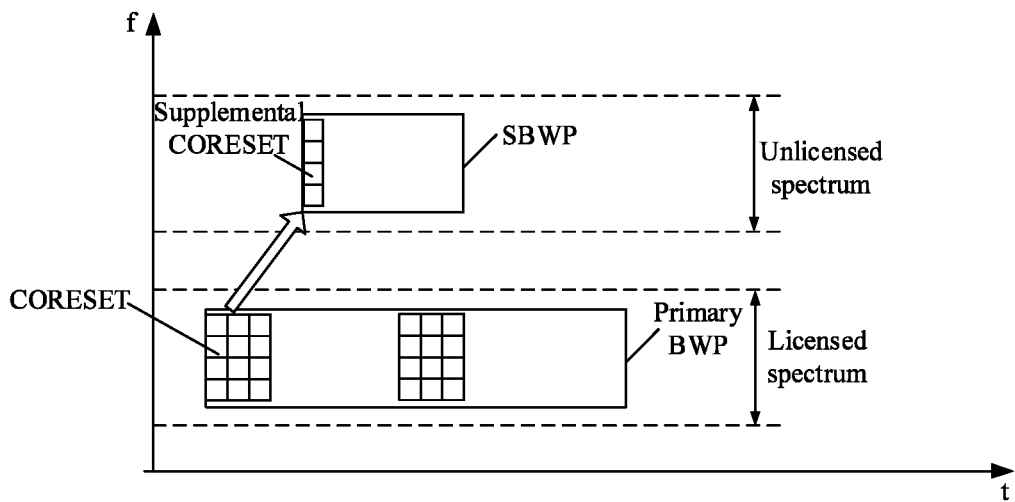
FIG. 9C is a schematic diagram of another application scenario of information transmission according to an exemplary embodiment.

Similarly, in the embodiments of the present disclosure, a small amount of control information transmission resources, which are called the supplemental control information transmission resources in the present disclosure, may also be set in the SBWP. When the control information transmission resource is the CORESET, it may be called the supplemental CORESET, as shown in FIG. 9C.

The base station may set a part of the scheduling information of the SBWP into the control information transmission resource of the primary BWP according to the preset carrier location information, and set the rest scheduling information of the SBWP into the supplemental control information transmission resource of the SBWP, so that the target UE can parses a part of the scheduling information of the SBWP out from specified location resources of the primary BWP according to the supplemental control information transmission resource, and then parse the rest scheduling information of the SBWP out from the specified location resources of the SBWP. In such a manner, the scheduling information of the SBWP is acquired completely, and then the transmission configuration may be performed according to the complete scheduling information, so that the transmission resources of the SBWP may be used for service data transmission later.

It is to be noted that in another embodiment of the present disclosure, in order to improve the reliability of the scheduling information of the SBWP acquired by the target UE, the base station may also set the scheduling information of the SBWP into the control information transmission resource of the primary BWP and the SBWP redundantly; that is, both the first manner and the second manner are used to transmit the scheduling information of the SBWP to the target UE, which is not limited by the present disclosure.

In operation 133, the transmission resources of the primary BWP and the SBWP are scheduled according to preset scheduling information of the primary BWP and the scheduling information of the SBWP to perform information transmission.

In the present disclosure, after determining that the target UE has completed the transmission configuration for the primary BWP and the SBWP, the base station may schedule the data transmission resources of the primary BWP for the target UE according to the preset scheduling information while scheduling the data transmission resources of the SBWP according to the scheduling information of the SBWP determined in operation 131. In such a manner, the base station and the target UE may perform information transmission through both the primary BWP in the licensed spectrum and the SBWP in the unlicensed spectrum, thus improving efficiency of information transmission.

Figure 11:
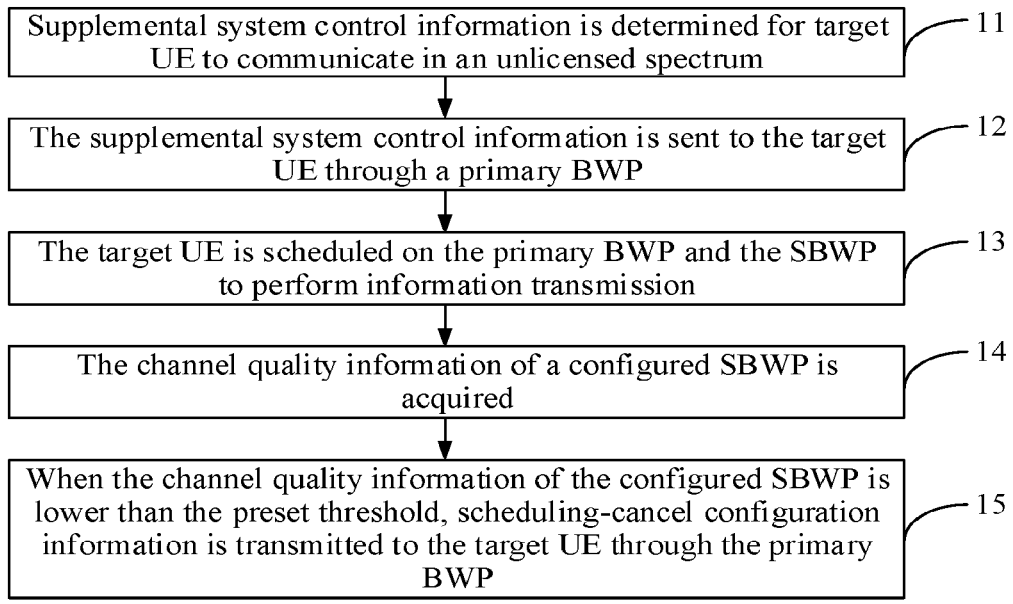
FIG. 11 is a flowchart of another method for transmitting information according to an exemplary embodiment.

Referring to FIG. 11 that illustrates another method for transmitting information according to an exemplary embodiment, on the basis of any above embodiment, after operation 13, the method may further include an operation 14, which includes that the channel quality information of a configured SBWP is acquired.

In the embodiments of the present disclosure, after allocating the SBWP, for example, a first SBWP, to the target UE, the base station may continue to monitor the channel quality information of the first SBWP. The configured SBWP may include the following two states: a scheduled state and an unscheduled state.

Still taking the first SBWP as an example. In a case that the base station has scheduled the first SBWP for the target UE, the base station may acquire a data transmission rate of the target UE on the first SBWP, so as to monitor the channel quality of the first SBWP in real time. In a case that the base station has not scheduled the first SBWP, the base station may continue to monitor the channel quality of the configured SBWP according to the reference signal.

In operation 15, when the channel quality information of the configured SBWP is lower than the preset threshold, scheduling-cancel configuration information is transmitted to the target UE through the primary BWP. The scheduling-cancel configuration information is configured to inform the target UE of information about scheduling cancellation of the configured SBWP.

The scheduling-cancel configuration information may include: the time-frequency resource information of the configured SBWP that is canceled from being scheduled, and scheduling cancel control signaling for the configured SBWP.

In the embodiments of the present disclosure, when the base station detects that the channel quality of the configured SBWP is lower than the preset threshold, which indicates that the configured SBWP has a large interference and is not suitable for information transmission, the base station may also decide to cancel the scheduling of the target UE on the SBWP, and send the generated scheduling-cancel configuration information to the target HE through the control information transmission resource of the primary BWP, so as to inform the target UE to cancel the scheduling of the allocated SBWP.

Figure 12:
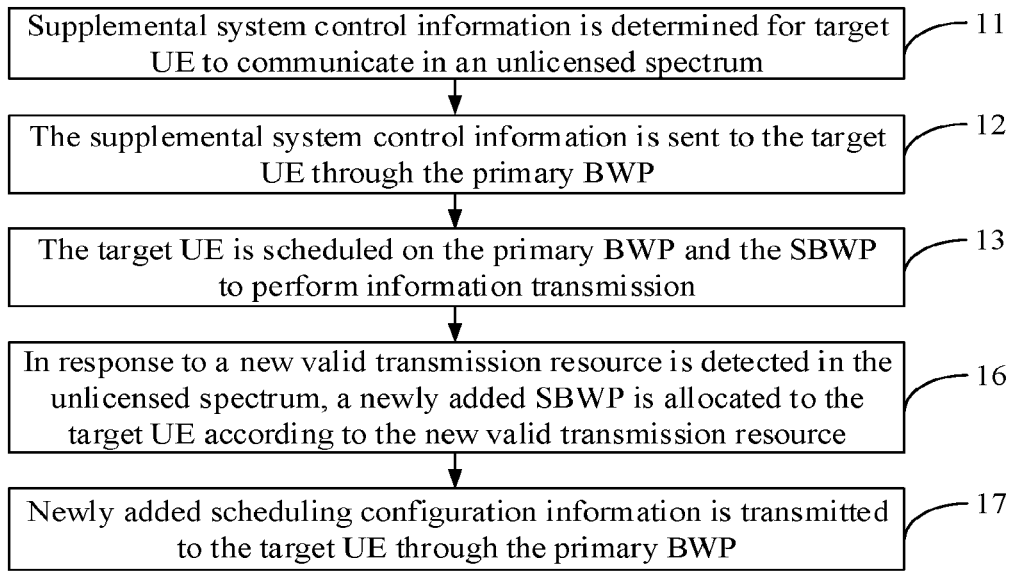
FIG. 12 is a flowchart of another method for transmitting information according to an exemplary embodiment.

FIG. 12 illustrates another method for transmitting information according to an exemplary embodiment, on the basis of any above embodiment, after operation 13, the method may further include operations below.

In an operation 16, in response to that a new valid transmission resource is detected in the unlicensed spectrum, a newly added SBWP is allocated to the target UE according to the new valid transmission resource. In the embodiments of the present disclosure, after transmitting the supplemental system control information to the target UE, the base station may also continue to monitor a valid transmission resource matching with the target frequency range which can be supported by the target UE. After detecting the new valid transmission resource, the base station may also allocate a newly added SBWP according to needs.

In operation 17, newly added scheduling configuration information is transmitted to the target UE through the primary BWP, the newly added scheduling configuration information being configured to inform the target UE to add transmission configuration for the newly added SBWP.

In the embodiments of the present disclosure, the newly added scheduling configuration information may include: a frequency domain resource range and a time domain resource range of the newly added SBWP in the unlicensed spectrum, scheduling information of the newly added SBWP, etc. Or, similar to the supplemental system control information in operation 11, carrier location information of scheduling information of the newly added SBWP, rather than the scheduling information of the SBWP, may be included in the newly added scheduling configuration information.

In the embodiments of the present disclosure, after transmitting the supplemental system control information to the target UE, the base station may also continue to monitor a valid transmission resource in the unlicensed spectrum, and after the valid transmission resource is detected, add the SBWP for the target UE according to needs, so that the target UE can use more unlicensed spectra to perform information transmission. In such a manner, the efficiency of information transmission between the base station and the target UE is further improved, and the utilization rate of the unlicensed spectrum resources is improved.

In another embodiment of the present disclosure, on the basis of any above embodiment, the base station may also first determine whether the target UE supports an SBWP function presently before allocating a SBWP resource in the unlicensed spectrum to the target UE.

Figure 13:
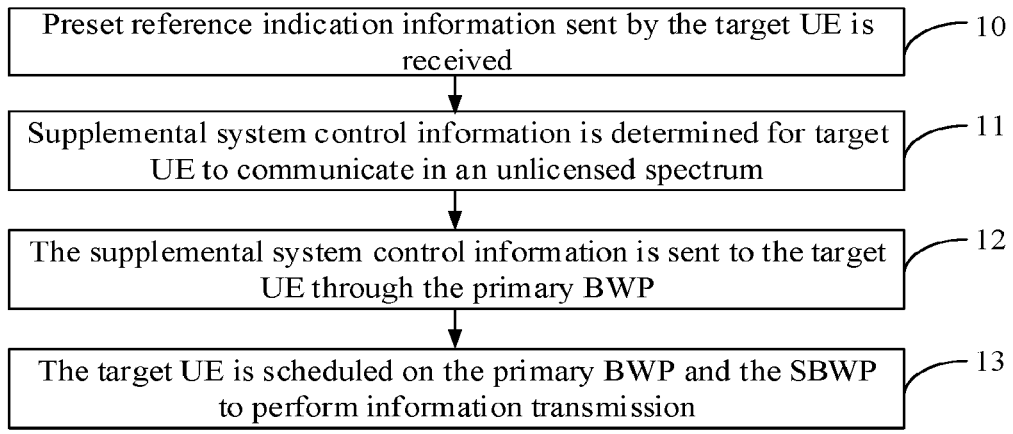
FIG. 13 is a flowchart of another method for transmitting information according to an exemplary embodiment.

FIG. 13 illustrates a flowchart of another method for transmitting information, before operation 11, the method may further include operations below.

In operation 10, preset reference indication information sent by the target UE is received, the preset reference indication information being configured to determine whether the target UE supports the SBWP function presently.

Correspondingly, operation 11 may be specifically that, in response to that determining according to the preset reference indication information that the target UE supports the SBWP function presently, the supplemental system control information is determined for the target UE to communicate in the unlicensed spectrum.

In an embodiment of the present disclosure, the preset reference indication information may be power consumption state information reported by the target UE. The power consumption state information may include that present heat information like a body temperature of the target UE, a transmission power of the target UE, consumed or remaining electric quantity of the target UE, and the like, or a physical quantity related to power consumption which is synthetically determined according to the power consumption state information.

The base station may determine, on the basis of the power consumption state information reported by the target UE, whether the target UE supports the SBWP function presently according to a preset rule. For example, when the present body temperature of the target UE does not exceed a preset temperature threshold, it may be determined that the target UE supports the SBWP function presently; otherwise, when the present body temperature of the target UE exceeds the preset temperature threshold, it may be determined that the target UE does not support the SBWP function presently, and it is not needed to perform the subsequent operation 11 to operation 13.

In another embodiment of the present disclosure, the preset reference indication information may also be preset indication information that is sent by the target UE to represent whether to support the SBWP function. The preset indication information may include support indication information representing that the target UE supports the SBWP function presently, or may include reject indication information representing that the target UE does not support the SBWP function presently.

As for the transmission process of the preset indication information, in order to save the signaling overhead, the preset indication information may be represented by a bit. For example, the support indication information may be represented by a binary value 1, and the reject indication information may be represented by a value 0.

When the base station receives the support indication information from the target UE, operation 11 to operation 13 may be performed. Otherwise, in response to that receiving the reject indication information from the target UE, the base station may not allocate an unlicensed spectrum resource to the target UE, that is, operation 11 may be not performed later.

In another embodiment of the present disclosure, in a case that the system agrees that the target UE periodically reports the preset reference indication information to the base station, the method may further include operations below.

In operation A, it is determined, according to a service carrying condition and/or power consumption state information of the base station, whether allocation of a SBWP resource for the UE is presently supported.

In an embodiment of the present disclosure, the base station may determine a present service load condition according to the amount of the UE accessing the signal coverage area of the base station. When the present service load of the base station exceeds a preset load threshold, to ensure network transmission performance, the base station may reject to allocate a SBWP resource in the unlicensed spectrum to the target UE.

In another embodiment of the present disclosure, the base station may also determine whether the SBWP resource allocation function is supported presently according to its own power consumption state information such as generated heat and transmission power. Exemplarily, when the present transmission power of the base station exceeds a preset power threshold, it may be determined that the SBWP resource allocation function is not supported.

In another embodiment of the present disclosure, the base station may also determine a comprehensive physical quantity representing the load of the base station according to the present service carrying situation and power consumption state, and compare the comprehensive physical quantity with the preset threshold, so as to determine whether the base station presently supports the SBWP resource allocation function.

In operation B, in response to that the base station does not support the SBWP resource allocation function, the preset control information for instructing the UE to stop reporting the reference indication information to the UE is transmitted to the UE.

In response to that the base station determines that the SBWP resource allocation function is not supported presently, in order to prevent the target UE from continuing reporting the preset reference indication information, the base station may send the preset control information to the UE, so as to instruct the UE to stop reporting the preset reference indication information to the base station through the preset control information. In such a manner, the signaling overhead is saved and UE power consumption is reduced, at the same time, more power consumption due to processing the above information by the base station can also be reduced.

When the base station determines that the SBWP resource allocation function is supported presently, operation 10 or operation 11 may be performed.

It is to be noted that in the present disclosure, the base station may send the supplemental system control information, the scheduling information of the SBWP, the scheduling-cancel configuration information or the newly added scheduling configuration information to the target UE through any of the following: broadcast signaling, upper signaling or physical layer downlink control signaling. The upper signaling may be Radio Resource Control (RRC) signaling or Medium Access Control (MAC) Control Element (CE) signaling.

Figure 14:
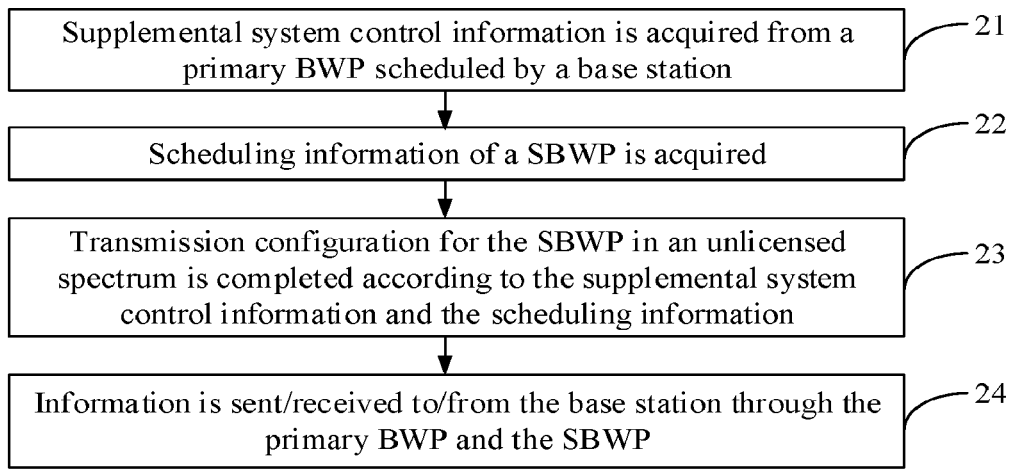
FIG. 14 is a flowchart of a method for transmitting information according to an exemplary embodiment.

Correspondingly, the present disclosure further provides a method for transmitting information, which is applied to UE, namely the target UE. Referring to FIG. 14 that illustrates a flowchart of a method for transmitting information according to an exemplary embodiment, the method may include operations as below.

In operation 21, supplemental system control information is acquired from a primary BWP scheduled by a base station, the primary BWP being a BWP configured by the base station for the UE in a licensed spectrum.

Corresponding to operation 12, in the present disclosure, the UE may acquire the supplemental system control information related to the SBWP in an unlicensed spectrum from a control information transmission resource of the primary BWP in the licensed spectrum.

In terms of acquiring manners, the UE may detect the supplemental system control information for itself in the CORESET of the primary BWP through a blind detection, or detect the supplemental system control information for itself from a preset location of the control information transmission resource of the primary BWP according a preset rule.

As mentioned above, the supplemental system control information in the present disclosure may at least include a time-frequency resource range of the SBWP. The supplemental system control information may further include carrier location information of scheduling information of the SBWP and other information.

The time-frequency range information of the SBWP determined by the UE may be represented by different ways, the UE may determine the time-frequency resource range of the SBWP in the following manners.

First manner is that, when the time-frequency range information of the SWBP includes a preset channel identifier such as 1 and a time domain resource range, the UE may determine a frequency domain resource range according to the preset channel identifier, and determine a time-frequency resource range of the SBWP to be scheduled by the base station based on the time domain resource range.

Second manner is that, when the transmission configuration information of the SBWP includes a time-frequency resource range of the SBWP to be scheduled, relevant transmission configuration is performed according to the time-frequency resource range.

In operation 22, scheduling information of a SBWP is acquired. In an embodiment of the present disclosure, after the UE parses the supplemental system control information related to the SBWP out from the control information transmission resource of the primary BWP, the supplemental system control information may include the carrier location information of the scheduling information of the SBWP.

Corresponding to the implementation mode of operation 132, the UE may acquire the scheduling information of the SBWP by at least one of following modes.

First implementation mode is that, the UE searches the control information transmission resource such as the CORESET of the primary BWP for its own scheduling information of the SBWP according to the carrier location information.

Second implementation mode is that, the UE retrieves its own scheduling information of the SBWP from a supplemental control information transmission resource of the SBWP such as the supplemental CORESET that is set at the head of the SBWP, referring to FIG. 9C, according to the carrier location information.

Third implementation mode is that, a part of the scheduling information of the SBWP is acquired from the primary BWP according to the carrier location information, the rest of the scheduling information of the SBWP is acquired from a supplemental control information transmission resource of the SBWP, and thus the scheduling information of the SBWP is acquired completely.

In another embodiment of the present disclosure, corresponding to the situation in which the scheduling information of the SBWP is set redundantly, if the scheduling information of the SBWP read by the UE from the primary BWP is inconsistent with the scheduling information of the SBWP read by the UE from the SBWP, the scheduling information of the SBWP read from the SBWP can be regarded as accurate information considering that the transmission information of the primary BWP in the licensed spectrum is more reliable.

In operation 23, transmission configuration for the SBWP in an unlicensed spectrum is completed according to the supplemental system control information and the scheduling information.

After acquiring the time-frequency resource range and other information of the SBWP, the UE may perform relevant transmission configuration, so as to have an RF transceiver capability for the SBWP in the unlicensed spectrum. In addition, after acquiring the scheduling information of the SBWP, such as uplink and downlink resource configuration information and modulation and demodulation mode information, the UE may further perform the transmission configuration of the SBWP, so that the UE can perform downlink information transmission and/or uplink information transmission through the transmission resources of the SBWP.

In operation 24, information is sent/received to/from the base station through the primary BWP and the SBWP. Both the primary BWP and the SBWP can be utilized to transmit information according to the preset scheduling information of the primary BWP acquired in advance and the scheduling information of the SBWP acquired in operation 22.

Figure 15:
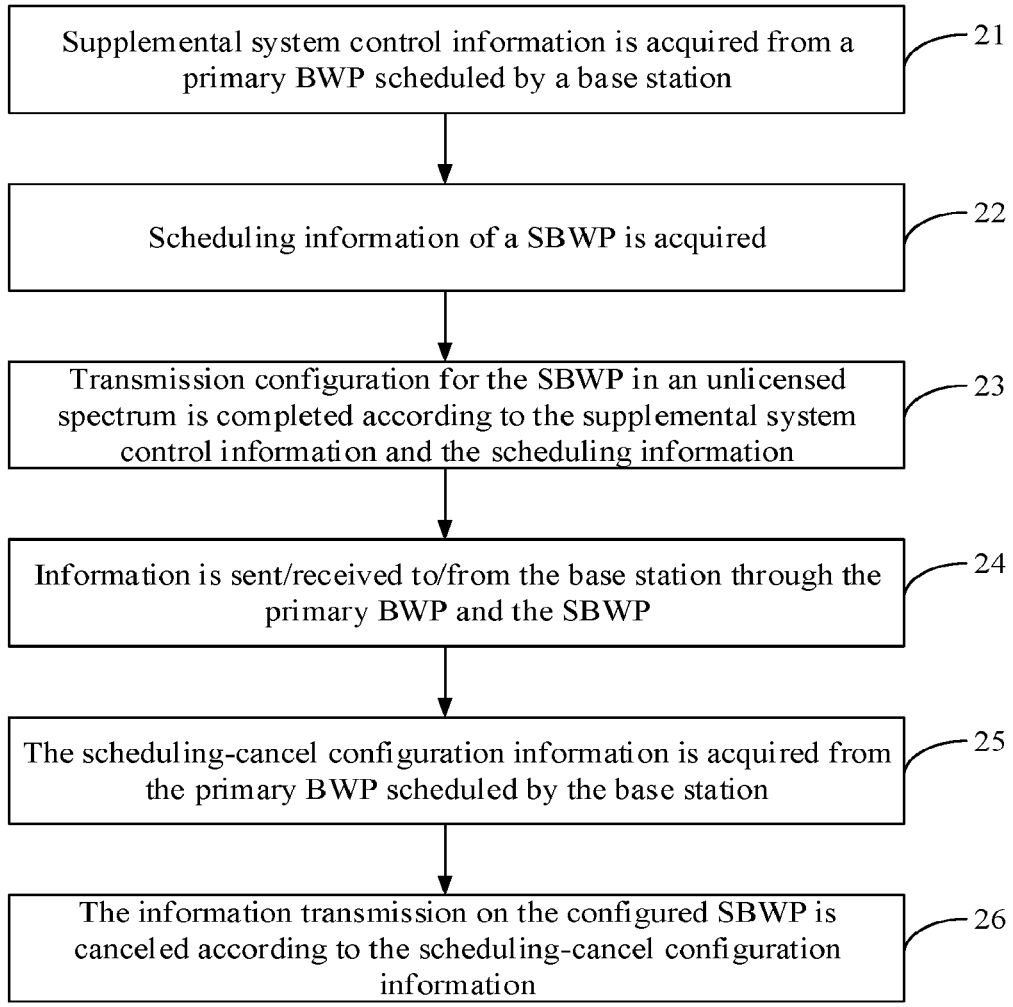
FIG. 15 is a flowchart of another method for transmitting information according to an exemplary embodiment.

Referring to FIG. 15 that illustrates a flowchart of another method for transmitting information, after operation 24, the method may further include:

In operation 25, the scheduling-cancel configuration information is acquired from the primary BWP scheduled by the base station. The scheduling-cancel configuration information is configured to inform the UE of the information about scheduling cancellation of the configured SBWP.

Similarly, the UE may acquire the scheduling-cancel configuration information sent by the base station from the primary BWP of the base station. The scheduling-cancel configuration information may include: an identifier or time-frequency range information of a configured SBWP, so that the UE can determine a SBWP that is to be cancelled from being scheduled by the base station.

In operation 26, the information transmission on the configured SBWP is canceled according to the scheduling-cancel configuration information. In the embodiments of the present disclosure, when the UE acquires the scheduling-cancel configuration information at time T1, the operation that the information transmission on the configured SBWP is canceled may include following two situations according to the scheduling situation of the SBWP by the base station at time T1.

First situation is that, in response to that the UE has completed transmission configuration of the canceled SBWP, the transmission configuration of the canceled SBWP may be closed according to the scheduling-cancel configuration information, that is, the target UE is enabled to not work within the time-frequency range corresponding to the above canceled SBWP.

Second situation is that, in response to that the UE has completed the transmission configuration of the target SBWP and has transmitted a part of information through the target SBWP, the UE, after acquiring the scheduling-cancel configuration information, may cancel transmission of the information waiting to be transmitted according to time-frequency resource information of the SBWP that is cancelled from being scheduled.

It is to be noted that in another embodiment of the present disclosure, operation 25 and operation 26 may also be performed after operation 23, and operation 24 may be that the primary BWP and the remaining SBWP are utilized to transmit information.

Figure 16:
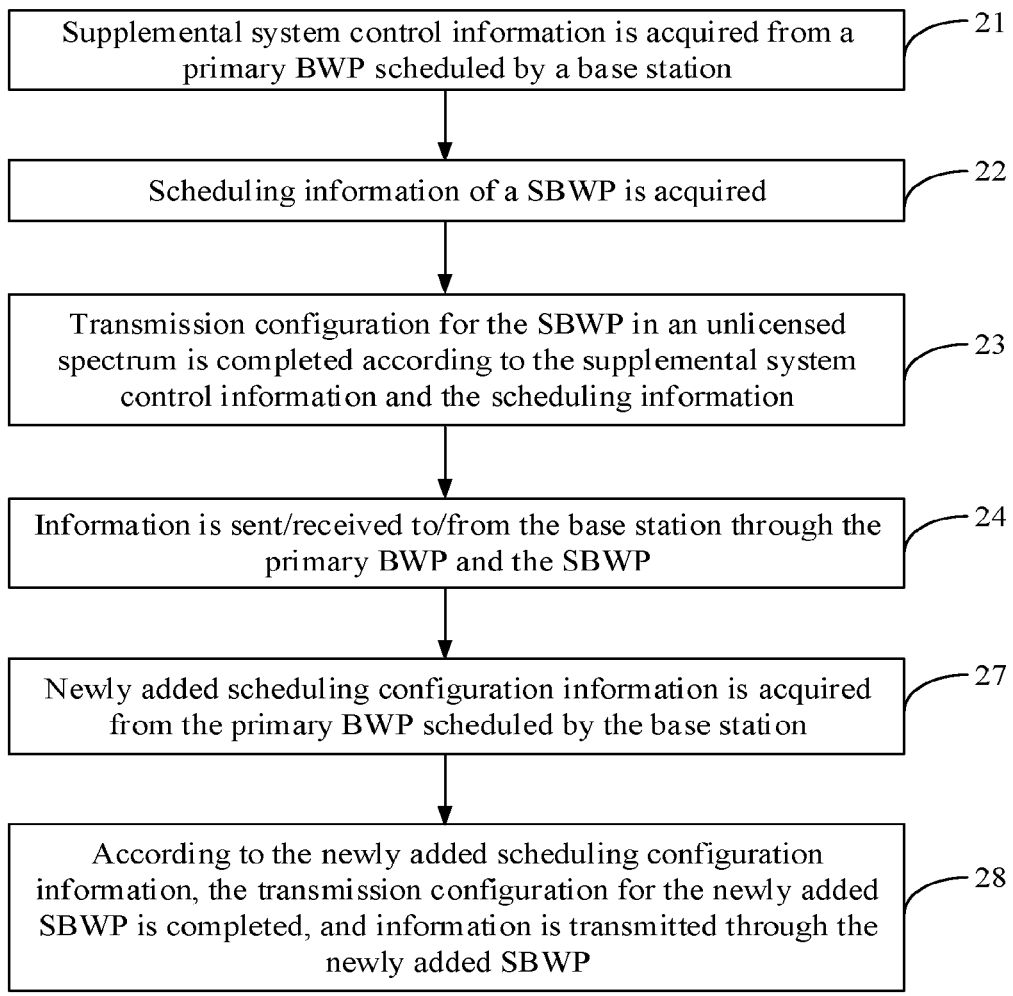
FIG. 16 is a flowchart of another method for transmitting information according to an exemplary embodiment.

FIG. 16 illustrates a flowchart of another method for transmitting information, after operation 23, the method may further include operations as below.

In operation 27, newly added scheduling configuration information is acquired from the primary BWP scheduled by the base station. The newly added scheduling configuration information is configured to inform the UE of adding transmission configuration of the newly added SBWP.

Similarly, the UE may acquire scheduling configuration information newly added by the base station for the UE from the control information transmission resource of the primary BWP scheduled by the base station for the UE. Similar to the supplemental system control information, except the time-frequency resource range of the newly added SBWP, the newly added scheduling configuration information may further include the carrier location information of the newly added SBWP, so that the UE can quickly acquire, according to the carrier location information, the scheduling information of the newly added SBWP from the control information transmission resource of the present primary BWP or the supplemental control information transmission resource of the newly added SBWP. In such a manner, efficiency of the UE acquiring the scheduling information of the newly added SBWP is improved.

In operation 28, according to the newly added scheduling configuration information, the transmission configuration for the newly added SBWP is completed, and information is transmitted through the newly added SBWP. In the embodiments of the present disclosure, the UE may also receive in real time the newly added scheduling configuration information from the base station, and add a new SBWP, At the same time, the UE may also perform information transmission through the newly added SBWP without affecting configured transmission information of a SBWP, thus further improving the rate of information transmission between the base station and UE, and improving the user experience in the use of 5G NR network devices.

Corresponding to the embodiment shown in FIG. 13, in an embodiment of the present disclosure, before operation 21, the UE may also report its own preset reference indication information to the base station periodically or at irregular intervals, so as to enable the base station to determine whether the target UE supports the SBWP function presently, which prevents the base station from allocating a SBWP resource to the target UE even if the target UE does not support the SBWP function, and avoids waste of signaling overheads and power consumption of the base station. The preset reference indication information may be either present power consumption state information of the UE, or preset indication information that is determined by the UE according to its own power consumption state information for representing whether the SBWP function is supported presently.

In the present disclosure, the UE may report the preset reference indication information to the base station through physical layer signaling or upper signaling. The upper signaling may be RRC signaling or MAC CE signaling.

In another embodiment of the present disclosure, for the case that the UE transmits the preset reference indication information to the base station, the method may further include that, in response to that the preset control information sent by the base station is received, reporting the reference indication information to the base station is stopped.

In the embodiments of the present disclosure, when the present UE receives the preset control information from the base station, the UE may stop reporting the preset reference indication information to the base station, thus preventing the UE from continuing reporting invalid information to the base station even if the base station does not support the SBWP resource allocation function, and reducing the power consumption of the UE and the base station. The preset control information may be indication information indicating that the base station does not support SBWP resource allocation presently, or may be signaling information informing the base station to stop reporting the preset reference indication information.

For simple description, each of the above method embodiments is expressed as a combination of a series of operations, but those skilled in the art should know that the present disclosure is not limited to the described operation sequence because some operations can be executed in other sequences or at the same time according to the present disclosure. Secondly, those skilled in the art should also know that the embodiments described in the specification are optional embodiments, and the operations and modules involved are not necessarily necessary for the present disclosure.

Corresponding to the embodiments of methods for implementing application functions, the present disclosure further provides embodiments of a device for implementing application functions and a corresponding terminal.

Figure 17:
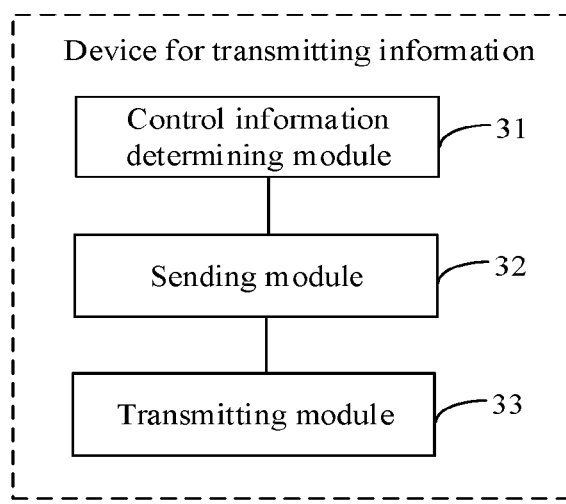
FIG. 17 is a block diagram of a device for transmitting information according to an exemplary embodiment.

Correspondingly, the present disclosure provides a device for transmitting information, which may be arranged in a base station. FIG. 17 illustrates a block diagram of a device for transmitting information according to an exemplary embodiment. The device may include modules as below. Of course, it should be understood that one or more of the modules described in this disclosure can be implemented by processing circuitry.

A control information determining module 31 is configured to determine supplemental system control information for target UE to communicate in an unlicensed spectrum. The supplemental system control information is configured to inform the target UE of configuration information of a SBWP allocated in the unlicensed spectrum.

In another device embodiment of the present disclosure, the control information determining module 31 may be configured to determine the supplemental system control information for the target UE to communicate in the unlicensed spectrum according to a preset SBWP configuration rule. The preset SBWP configuration rule may include any one of following: allocating a BWP resource for the target UE on a preset specified channel in the unlicensed spectrum; and allocating a BWP resource in the unlicensed spectrum for the target UE according to a historical scheduling record of the target UE in the unlicensed spectrum.

A sending module 32 is configured to send the supplemental system control information to the target UE through the primary BWP, the primary BWP being a BWP allocated in a licensed spectrum by the base station to the target UE.

A transmitting module 33 is configured to schedule the target UE on the primary BWP and the SBWP to perform information transmission.

Figure 18:
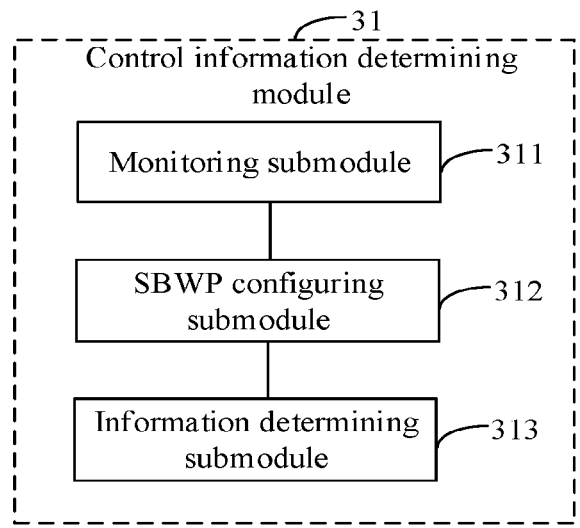
FIG. 18 is a block diagram of another device for transmitting information according to an exemplary embodiment.

FIG. 18 illustrates a block diagram of another device for transmitting information according to an exemplary embodiment, on the basis of the device embodiment shown in FIG. 17, the control information determining module 31 may include a monitoring submodule 311 that is configured to monitor a valid transmission resource that meets a preset channel quality condition in the unlicensed spectrum, an SBWP configuring submodule 312 that is configured to allocate the SBWP for the target UE according to the valid transmission resource, and an information determining submodule 313 that is configured to determine the supplemental system control information according to a time-frequency resource range of the SBWP.

Figure 19:
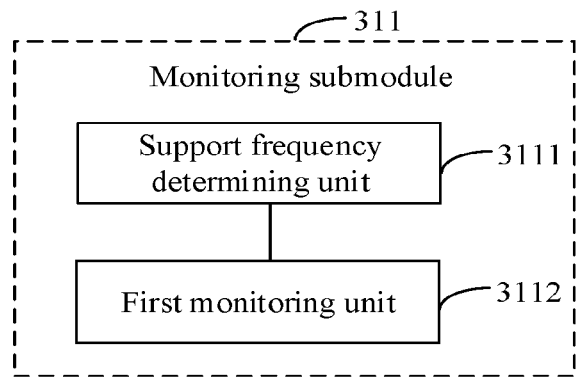
FIG. 19 is a block diagram of another device for transmitting information according to an exemplary embodiment.

Referring to FIG. 19 that illustrates a block diagram of another device for transmitting information according to an exemplary embodiment, on the basis of the device embodiment shown in FIG. 18. The monitoring submodule 311 may include a support frequency determining unit 3111 that is configured to determine a target frequency range supported by the target UE in the unlicensed spectrum, and a first monitoring unit 3112 that is configured to monitor, in the target frequency range, the valid transmission resource that meets the preset channel quality condition.

Figure 20:
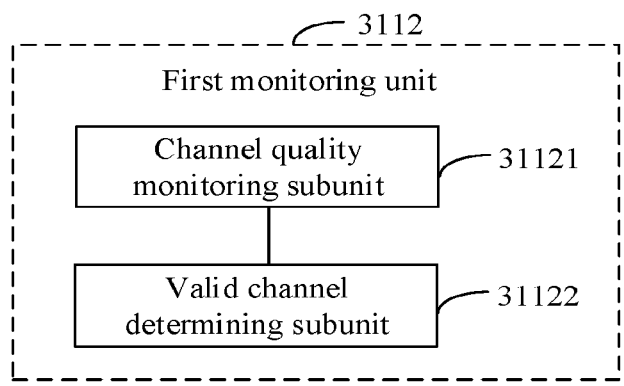
FIG. 20 is a block diagram of another device for transmitting information according to an exemplary embodiment.

Referring to FIG. 20 that illustrates a block diagram of another device for transmitting information according to an exemplary embodiment, on the basis of the device embodiment shown in FIG. 19. The first monitoring unit 3112 may include a channel quality monitoring subunit 31121 that is configured to monitor, in the target frequency range, channel quality information of a preset channel according to a preset channel bandwidth, and a valid channel determining subunit 31122 that is configured to determine, when the channel quality information is greater than or equal to the preset channel quality threshold, the preset channel as a valid channel.

Figure 21:
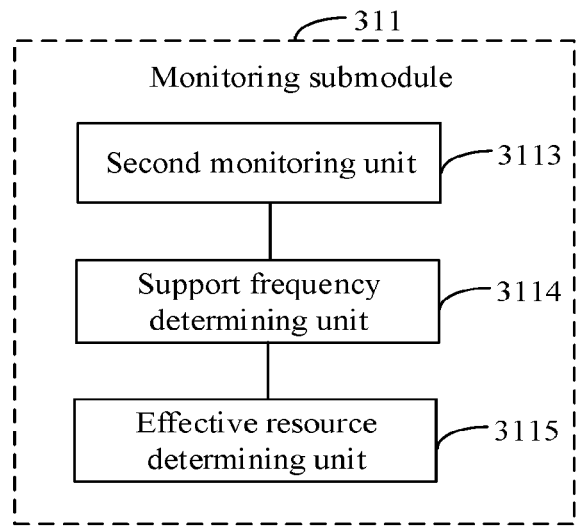
FIG. 21 is a block diagram of a device for transmitting information according to an exemplary embodiment.

Referring to FIG. 21 that illustrates a block diagram of another device for transmitting information according to an exemplary embodiment, on the basis of the device embodiment shown in FIG. 18. The monitoring submodule 311 may include a second monitoring unit 3113 that is configured to monitor, on the whole unlicensed spectrum, and a full-frequency valid transmission resource that meets the preset channel quality condition, support frequency determining unit 3114 that is configured to determine a target frequency range supported by the target UE in the unlicensed spectrum. In the embodiments of the present disclosure, the support frequency determining unit 3114 is similar to or the same as the support frequency determining unit 3111, for ease of description, different numbers are used here. The monitoring submodule 311 can further include a valid resource determining unit 3115, configured to determine the valid transmission resource according to the coincidence frequency range of the full-frequency valid transmission resource and the target frequency range.

Figure 22:
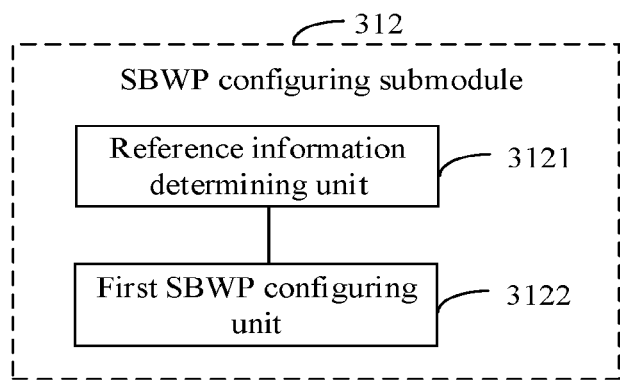
FIG. 22 is a block diagram of another device for transmitting information according to an exemplary embodiment.

Referring to FIG. 22 that illustrates a block diagram of another device for transmitting information according to an exemplary embodiment, on the basis of the device embodiment shown in FIG. 18, the SBWP configuring submodule 312 may include following units.

A reference information determining unit 3121 is configured to determine preset reference information of the target UE, the preset reference information being configured to assess whether the SBWP is required to be allocated to the target UE in the unlicensed spectrum.

In a device embodiment, the preset reference information may include at least one of followings: a volume of services to be transmitted, types of the services to be transmitted, or power consumption state information of the target UE;

The preset reference condition may include at least one of following: the volume of services to be transmitted exceeds a preset service volume threshold; the service type of the service to be transmitted includes a preset service type; or the power consumption state information does not exceed a preset power consumption threshold.

A first SBWP configuring unit 3122 is configured to allocate, in response to that the preset reference information meets a preset reference condition, the SBWP for the target UE according to the valid transmission resource.

Figure 23:
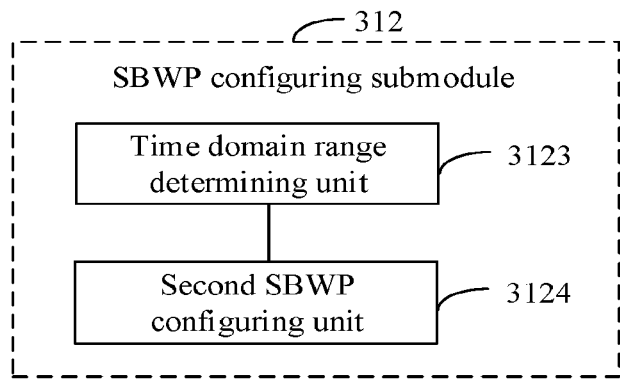
FIG. 23 is a block diagram of another device for transmitting information according to an exemplary embodiment.

Referring to FIG. 23 that illustrates a block diagram of another device for transmitting information according to an exemplary embodiment, on the basis of the device embodiment shown in FIG. 18, the SBWP configuring submodule 312 may include a time domain range determining unit 3123 that is configured to determine a time domain resource range allocated to the target UE on the valid channel, and a second SBWP configuring unit 3124 that is configured to determine, according to the time domain resource range and the preset channel bandwidth of the valid channel, the time-frequency resource range of the SBWP allocated to the target UE.

Figure 24:
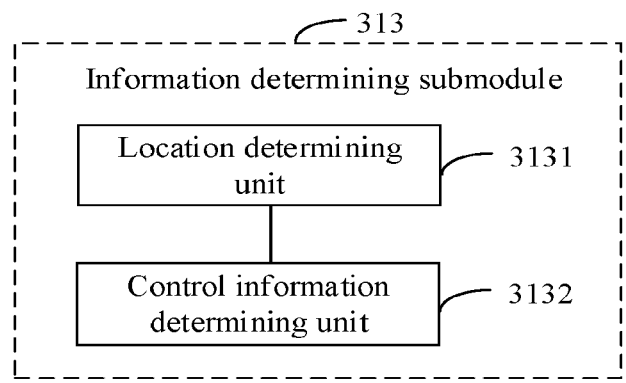
FIG. 24 is a block diagram of another device for transmitting information according to an exemplary embodiment.

Referring to FIG. 24 that illustrates a block diagram of another device for transmitting information according to an exemplary embodiment, on the basis of the device embodiment shown in FIG. 18, the information determining submodule 313 may further include a location determining unit 3131 that is configured to determine carrier location information of scheduling information of the SBWP, and a control information determining unit 3132 that is configured to determine the supplemental system control information according to the time-frequency resource range of the SBWP and the carrier location information of the scheduling information.

In another device embodiment of the present disclosure, the control information determining module 31 may further include the location determining unit and the control information determining unit.

Figure 25:
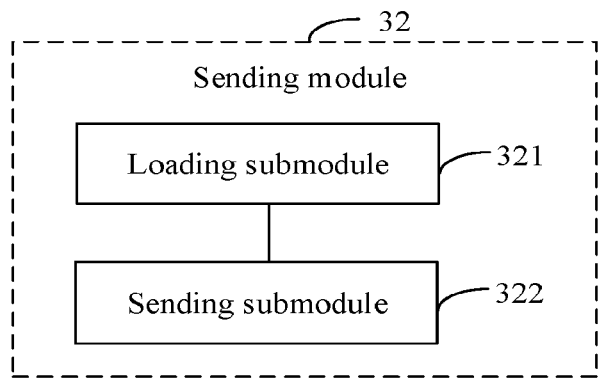
FIG. 25 is a block diagram of another device for transmitting information according to an exemplary embodiment.

Referring to FIG. 25 that illustrates a block diagram of another device for transmitting information according to an exemplary embodiment, on the basis of the device embodiment shown in FIG. 17. The sending module 32 may include a loading submodule 321 that is configured to load the supplemental system control information to a control resource set of the primary BWP, and a sending submodule 322 that is configured to transmit the supplemental system control information to the target UE through the control resource set of the primary BWP.

Figure 26:
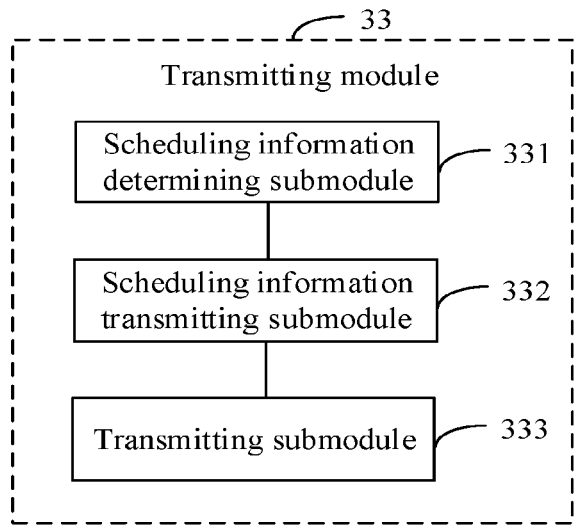
FIG. 26 is a block diagram of another device for transmitting information according to an exemplary embodiment.

Referring to FIG. 26 that illustrates a block diagram of another device for transmitting information according to an exemplary embodiment, on the basis of the device embodiment shown in FIG. 17, the transmitting module 33 may include a scheduling information determining submodule 331 that is configured to determine scheduling information of the SBWP, the scheduling information being configured to inform the target UE of configuration information of uplink and downlink transmission resources in the SBWP.

Further, the transmitting module 33 can include a scheduling information sending submodule 332 that is configured to send the scheduling information of the SBWP to the target UE, and a transmitting submodule 333 that is configured to schedule, according to preset scheduling information of the primary BWP and the scheduling information of the SBWP, transmission resources of the primary BWP and the SBWP to perform information transmission.

Figure 27:
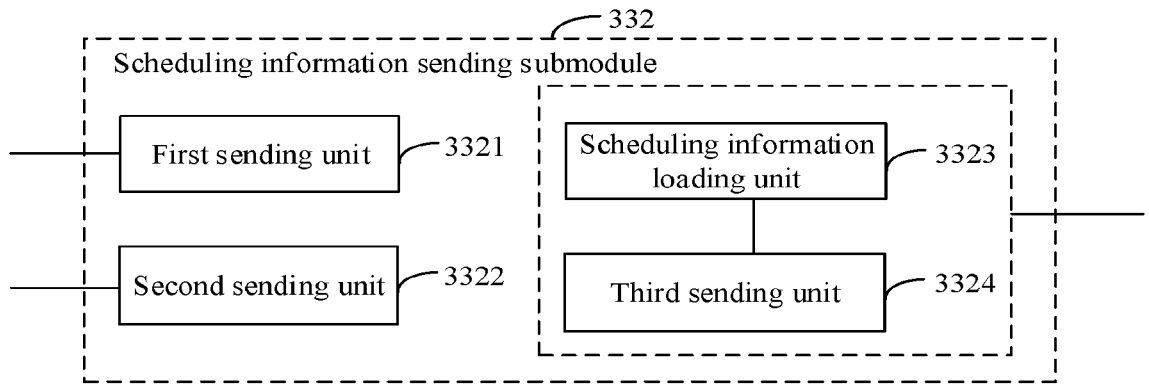
FIG. 27 is a block diagram of a device for transmitting information according to an exemplary embodiment.

Referring to FIG. 27 that illustrates a block diagram of another device for transmitting information according to an exemplary embodiment, on the basis of the device embodiment shown in FIG. 26, the scheduling information sending submodule 332 may include at least one of following: a first sending unit 3321 that is configured to set the scheduling information of the SBWP into a control information transmission resource of the primary BWP, and send the scheduling information to the target UE through the primary BWP; a second sending unit 3322, configured to set the scheduling information of the SBWP into a supplemental control information transmission resource of the SBWP, and send the scheduling information to the target UE through the SBWP; a scheduling information loading unit 3323, configured to set a part of the scheduling information of the SBWP into the primary BWP, and set the rest of the scheduling information of the SBWP into the SBWP; or a third sending unit 3324, configured to transmit a part of the scheduling information of the SBWP to the target UE through the primary BWP, and transmit the rest of the scheduling information of the SBWP to the target UE through a supplemental control information transmission resource of the SBWP.

A combination of the scheduling information loading unit 3323 and the third sending unit 3324 may belong to one of the above.

Figure 28:
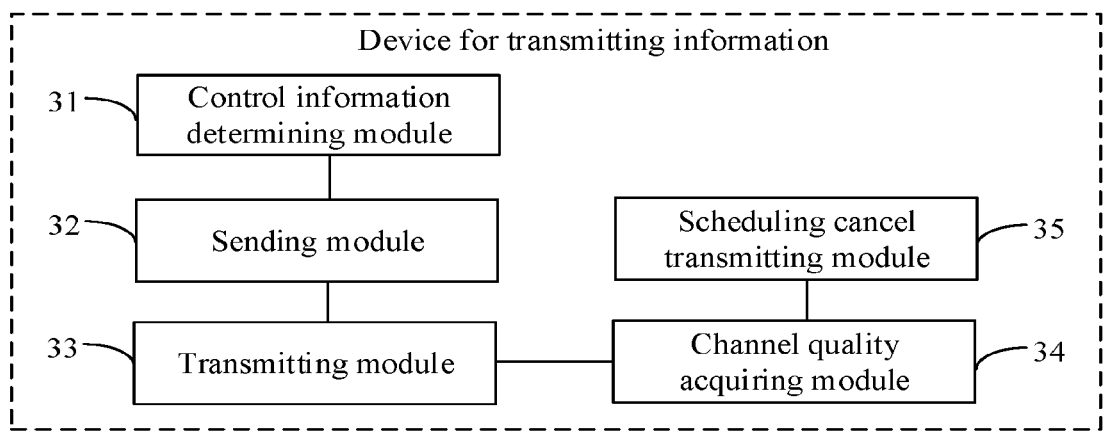
FIG. 28 is a block diagram of another device for transmitting information according to an exemplary embodiment.

FIG. 28 illustrates a block diagram of another device for transmitting information according to an exemplary embodiment, on the basis of the device embodiment shown in FIG. 17, the device may further include a channel quality acquiring module 34, configured to acquire the channel quality information of a configured SBWP, and a scheduling cancel sending module 35 that is configured to transmit, in response to that the channel quality information of the configured SBWP is lower than a preset threshold, scheduling-cancel configuration information to the target UE through the primary BWP. The scheduling-cancel configuration information is configured to inform the target UE of information about scheduling cancellation of the configured SBWP.

Figure 29:
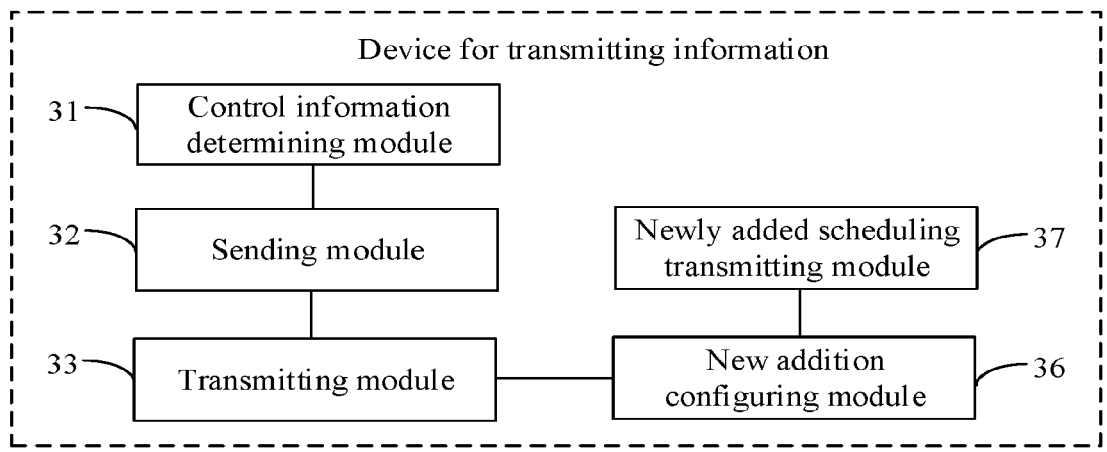
FIG. 29 is a block diagram of another device for transmitting information according to an exemplary embodiment.

FIG. 29 illustrates a block diagram of another device for transmitting information according to an exemplary embodiment, on the basis of the device embodiment shown in FIG. 17, the device may further include a new addition configuring module 36 that is configured to allocate, in response to that a new valid transmission resource is detected in the unlicensed spectrum, a newly added SBWP for the target UE according to the new valid transmission resource, and a newly added scheduling sending module 37 that is configured to send newly added configuration information to the target UE through the primary BWP. The newly added scheduling configuration information is configured to inform the target UE to add transmission configuration for the newly added SBWP.

Figure 30:
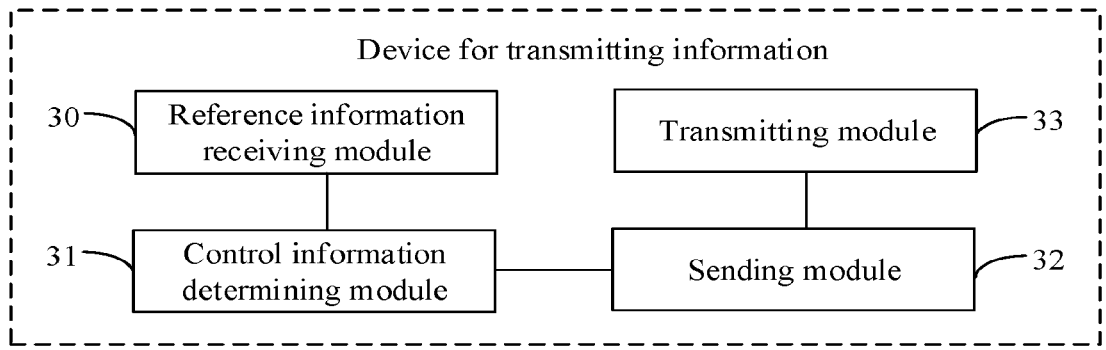
FIG. 30 is a block diagram of another device for transmitting information according to an exemplary embodiment.

FIG. 30 illustrates a block diagram of another device for transmitting information according to an exemplary embodiment, on the basis of the device embodiment shown in FIG. 17. The device may further include a reference information receiving module 30 that is configured to receive preset reference indication information from the target UE, the preset reference indication information being configured to determine whether the target UE supports an SBWP function presently.

Correspondingly, the control information determining module 31 is configured to determine the supplemental system control information for the target UE to communicate in the unlicensed spectrum, in response to that determining according to the preset reference indication information that the target UE supports the SBWP function presently.

The present disclosure further provides another device embodiment. On the basis of the device embodiment shown in FIG. 30, the device may further include a function determining module that is configured to determine, according to a service carrying condition and/or power consumption state information of the base station, whether an SBWP resource allocation function is presently supported. Additionally, the device can include a preset control information sending module that is configured to send, to the UE, preset control information for instructing the UE to stop reporting the reference indication information in response to that the base station does not support the SBWP resource allocation function.

Figure 31:
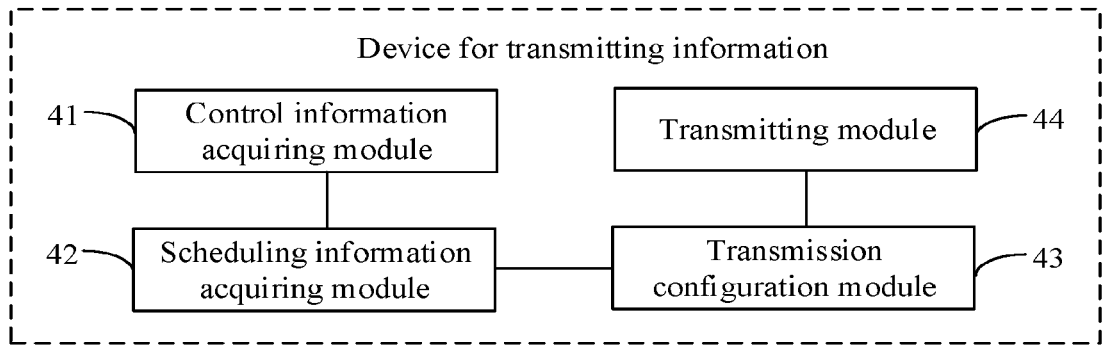
FIG. 31 is a block diagram of a device for transmitting information according to an exemplary embodiment.

Correspondingly, the present disclosure further provides a device for transmitting information arranged in the UE. FIG. 31 illustrates a block diagram of a device for transmitting information according to an exemplary embodiment. The device may include a control information acquiring module 41 that is configured to acquire supplemental system control information from a primary BWP scheduled by a base station, the primary BWP being a BWP configured in a licensed spectrum by the base station for the UE, and a scheduling information acquiring module 42 that is configured to acquire scheduling information of a SBWP. Further, the device can also include a transmission configuration module 43 that is configured to complete transmission configuration for the SBWP in an unlicensed spectrum according to the supplemental system control information and the scheduling information of the SBWP, and a transmitting module 44 that is configured to send/receive information to/from the base station through the primary BWP and the SBWP.

In another device embodiment of the present disclosure, the supplemental system control information may include carrier location information of the scheduling information of the SBWP.

Figure 32:
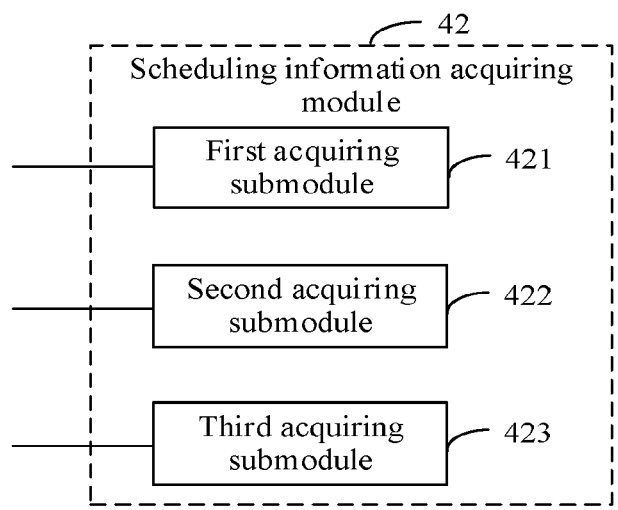
FIG. 32 is a block diagram of another device for transmitting information according to an exemplary embodiment.

Correspondingly, referring to FIG. 32 that illustrates a block diagram of another device for transmitting information according to an exemplary embodiment, on the basis of the device embodiment shown in FIG. 31. The scheduling information acquiring module 42 may include at least one of following: a first acquiring submodule 421 that is configured to acquire the scheduling information of the SBWP from a control information transmission resource of the primary BWP according to the carrier location information; a second acquiring submodule 422 that is configured to acquire a part of the scheduling information of the SBWP from the primary BWP according to the carrier location information and acquire the rest of the scheduling information of the SBWP from a supplemental control information transmission resource of the SBWP to acquire the scheduling information of the SBWP completely; or a third acquiring submodule 423 that is configured to acquire, according to the carrier location information, the scheduling information of the SBWP from a supplemental control information transmission resource of the SBWP.

Figure 33:
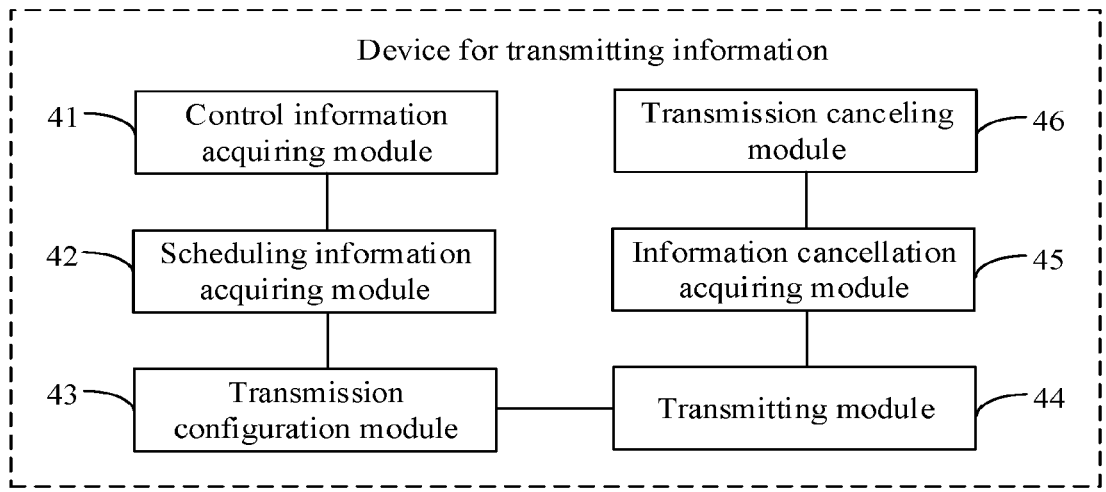
FIG. 33 is a block diagram of another device for transmitting information according to an exemplary embodiment.

FIG. 33 illustrates a block diagram of another device for transmitting information according to an exemplary embodiment, on the basis of the device embodiment shown in FIG. 31. The device may further include an Information cancellation acquiring module 45 that is configured to acquire scheduling-cancel configuration information from the primary BWP scheduled by the base station, the scheduling-cancel configuration information being configured to inform the UE of information about scheduling cancellation of a configured SBWP, and a transmission canceling module 46 that is configured to cancel information transmission on the configured SBWP according to the scheduling-cancel configuration information.

Figure 34:
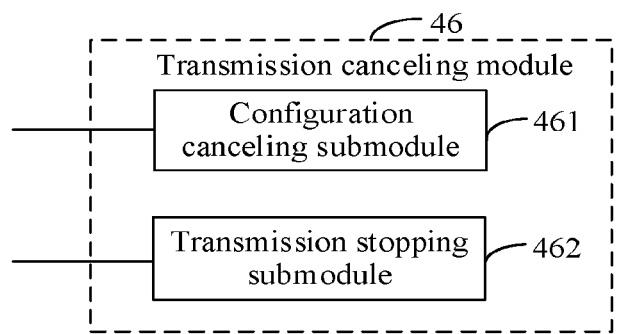
FIG. 34 is a block diagram of another device for transmitting information according to an exemplary embodiment.

FIG. 34 illustrates a block diagram of another device for transmitting information according to an exemplary embodiment, on the basis of the device embodiment shown in FIG. 33. The transmission canceling module 46 may include a configuration canceling submodule 461 that is configured to cancel the transmission configuration of the SBWP in response to that the configured SBWP is not scheduled, or a transmission stopping submodule 462 that is configured to stop the information transmission in response to that the UE is performing the information transmission on the configured SBWP.

Figure 35:
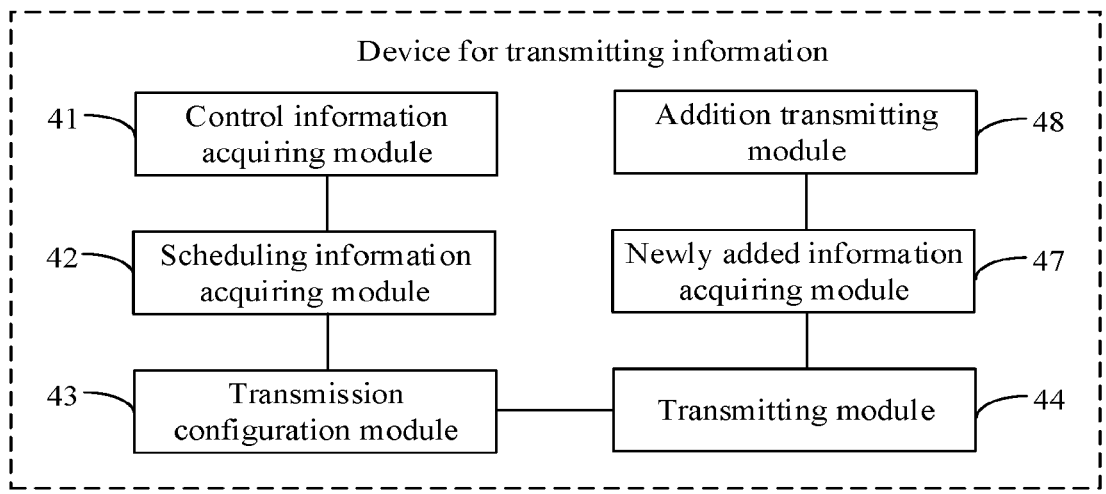
FIG. 35 is a block diagram of another device for transmitting information according to an exemplary embodiment.

FIG. 35 illustrates a block diagram of another device for transmitting information according to an exemplary embodiment, on the basis of the device embodiment shown in FIG. 31. The device may further include a newly added information acquiring module 47 that is configured to acquire newly added scheduling configuration information from the primary BWP scheduled by the base station, the newly added scheduling configuration information being configured to inform the UE of adding transmission configuration for a newly added SBWP. Additionally, the device can include an addition transmitting module 48 that is configured to complete the transmission configuration for the newly added SBWP according to the newly added scheduling configuration information and transmit information through the newly added SBWP.

Figure 36:
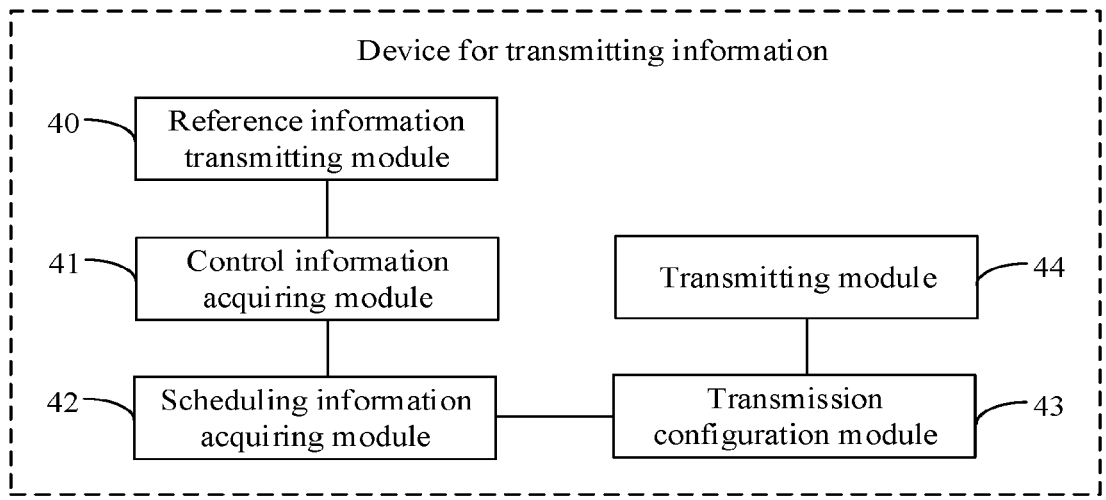
FIG. 36 is a block diagram of another device for transmitting information according to an exemplary embodiment.

FIG. 36 illustrates a block diagram of another device for transmitting information according to an exemplary embodiment, on the basis of the device embodiment shown in FIG. 31. The device may further include a reference information sending module 40 that is configured to send preset reference indication information to the base station, the preset reference indication information being configured to determine whether the UE supports an SBWP function presently.

On the basis of the device embodiment shown in FIG. 36, the device may further include a reporting canceling module that is configured to stop, in response to that preset control information sent by the base station is received, reporting the reference indication information to the base station.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement.

Correspondingly, on an aspect, a base station is provided, which may include a processor and a memory configured to store instructions executable by the processor. The processor can be configured to determine supplemental system control information for target UE to communicate in an unlicensed spectrum, the supplemental system control information being configured to inform the target UE of configuration information of a SBWP allocated in the unlicensed spectrum. The processor can be further configured to send the supplemental system control information to the target UE through a primary BWP, the primary BWP being a BWP allocated by the base station to the target HE in a licensed spectrum, and schedule the target UE on the primary BWP and the SBWP to perform information transmission.

On another aspect, a UE is provided, which may include a processor and a memory configured to store instructions executable by the processor. The processor can be configured to acquire supplemental system control information from a primary BWP scheduled by a base station, the primary BWP being a BWP configured by the base station for the UE in a licensed spectrum, and acquire scheduling information of a SBWP. The processor can be further configured to complete transmission configuration for the SBWP in an unlicensed spectrum according to the supplemental system control information and the scheduling information of the SBWP, and send/receive information to/from the base station through the primary BWP and the SBWP.

Figure 37:
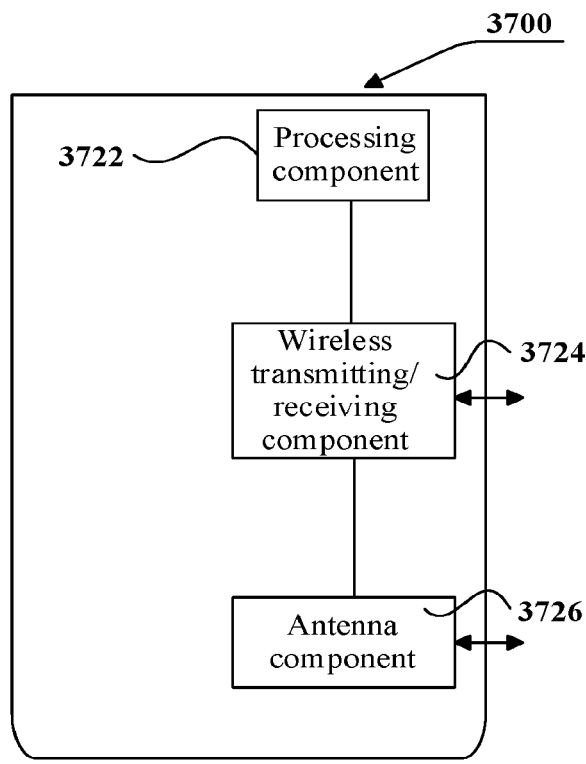
FIG. 37 is a structural schematic diagram of a base station according to an exemplary embodiment.

FIG. 37 illustrates a structural schematic diagram of a base station 3700 according to an exemplary embodiment. The base station is applied to the 5G NR network. Referring to FIG. 37, the base station 3700 includes a processing component 3722, a wireless transmitting/receiving component 3724, an antenna component 3726, and a special signal processing part of a wireless interface. The processing component 3722 may further include one or more processors.

A processor of the processing component 3722 may be configured to determine supplemental system control information for target UE to communicate in an unlicensed spectrum, the supplemental system control information being configured to inform the target UE of configuration information of a SBWP allocated in the unlicensed spectrum. Additionally, the processing component 3722 can be further configured to send the supplemental system control information to the target UE through a primary BWP, the primary BWP being a BWP allocated by the base station to the target UE in a licensed spectrum, and schedule the target UE on the primary BWP and the SBWP to perform information transmission.

In an exemplary embodiment, a non-transitory computer readable storage medium including instructions is further provided, which has computer instructions stored thereon. The computer instructions may be executed by the processing component 3722 of the base station 3700 to complete the method for transmitting information as illustrated in any one of FIG. 1 to FIG. 13. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device, and the like.

Figure 38:
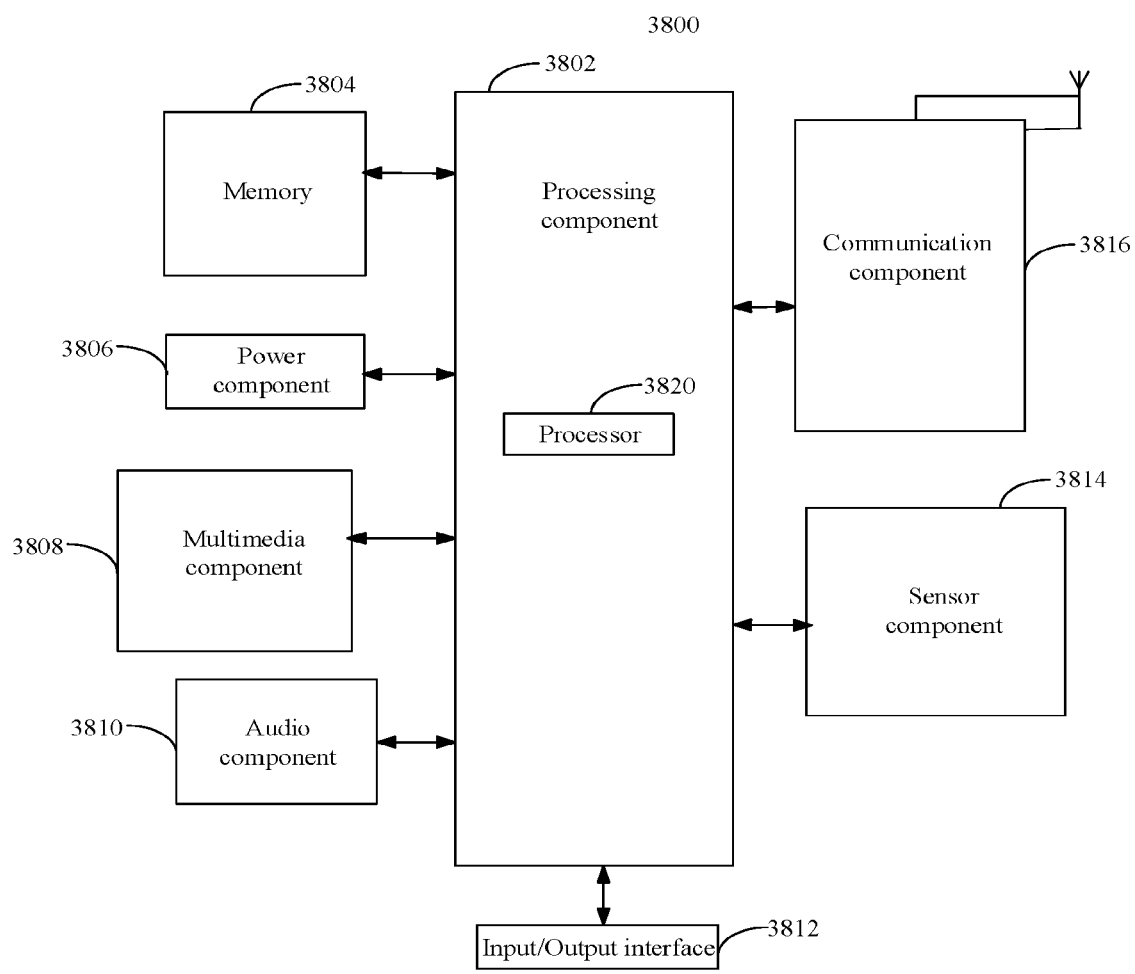
FIG. 38 is a structural schematic diagram of UE according to an exemplary embodiment.

FIG. 38 illustrates a structural schematic diagram of UE 3800 according to an exemplary embodiment. For example, the UE 3800 may be a terminal in the 5G NR network, specifically a mobile phone, a computer, a digital broadcast terminal, a messaging device, a gaming console, a tablet, a medical device, exercise equipment, a personal digital assistant, and wearable devices such as a smart watch, intelligent glasses, a smart bracelet, and smart running shoes.

Referring to FIG. 38, the device 3800 may include one or more of the following components: a processing component 3802, a memory 3804, a power component 3806, a multimedia component 3808, an audio component 3810, an Input/output (I/O) interface 3812, a sensor component 3814, and a communication component 3816.

The processing component 3802 typically controls overall operations of the device 3800, such as the operations associated with display, telephone calls, data communications, camera operations, and recording operations. The processing component 3802 may include one or more processors 3820 to execute instructions to perform all or part of the operations in the above method. Moreover, the processing component 3802 may include one or more modules which facilitate interaction between the processing component 3802 and the other components. For instance, the processing component 3802 may include a multimedia module to facilitate interaction between the multimedia component 3808 and the processing component 3802.

The memory 3804 is configured to store various types of data to support the operation of the device 3800. Examples of such data include instructions for any application programs or methods operated on the device 3800, contact data, phonebook data, messages, pictures, video, and the like. The memory 3804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 3806 is configured to provide power for various components of the device 3800. The power component 3806 may include a power management system, one or more power supplies, and other components associated with generation, management and distribution of power for the device 3800.

The multimedia component 3808 may include a screen providing an output interface between the device 3800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensor may not only sense a boundary of a touch or swipe action but also detect a length and pressure associated with the touch or swipe action. In some embodiments, the multimedia component 3808 includes a front camera and/or a rear camera. The front camera and/or the rear camera may receive external multimedia data when the device 3800 is in an operation mode, such as a photographing mode or a video mode. Each of the front camera and the rear camera may be a fixed optical lens system or have focusing and optical zooming capabilities.

The audio component 3810 is configured to output and/or input an audio signal. For example, the audio component 3810 includes a Microphone (MIC), and the MIC is configured to receive an external audio signal when the device 3800 is in the operation mode, such as a call mode, a recording mode and a voice recognition mode. The received audio signal may further be stored in the memory 3804 or sent through the communication component 3816. In some embodiments, the audio component 3810 further includes a speaker configured to output the audio signal.

The I/O interface 3812 is configured to provide an interface between the processing component 3802 and a peripheral interface module. The peripheral interface module may be a keyboard, a click wheel, a button, and the like. The button may include, but not limited to: a home button, a volume button, a starting button and a locking button.

The sensor component 3814 may include one or more sensors configured to provide status assessment in various aspects for the device 3800. For instance, the sensor component 3814 may detect an on/off status of the device 3800 and relative positioning of components, such as a display and small keyboard of the device 3800, and the sensor component 3814 may further detect a change in a position of the device 3800 or a component of the device 3800, presence or absence of contact between the user and the device 3800, orientation or acceleration/deceleration of the device 3800 and a change in temperature of the device 3800. The sensor component 3814 may include a proximity sensor configured to detect presence of an object nearby without any physical contact. The sensor component 3814 may further include a light sensor, such as a Complementary Metal Oxide Semiconductor (CMOS) or Charge Coupled Device (CCD) image sensor, configured for use in an imaging application. In some embodiments, the sensor component 3814 may further include an acceleration sensor, a gyroscope sensor, a magnetic sensor, a pressure sensor or a temperature sensor.

The communication component 3816 is configured to facilitate wired or wireless communication between the device 3800 and another device. The device 3800 may access a communication-standard-based wireless network, such as a Wi-Fi network, a 2nd-Generation (2G) or 3rd-Generation (3G) network or a combination thereof. In an exemplary embodiment, the communication component 3816 may receive a broadcast signal or broadcast associated information from an external broadcast management system through a broadcast channel. In an exemplary embodiment, the communication component 3816 may further include an NFC module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 3800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In an exemplary embodiment, a non-transitory computer-readable storage medium including instructions is further provided, such as the memory 3804 including instructions. The instruction may be executed by the processor 3820 of the device 3800 to implement the method for transmitting information as illustrated in any one of FIG. 14 to FIG. 16. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device, and the like.

According to the above embodiments of the present disclosure, a base station may configure a transmission resource, namely a SBWP, for target UE in an unlicensed spectrum, and determine supplemental system control information according to time-frequency resource information of the SBWP. The supplemental system control information is configured to inform the target UE of configuration information of the SBWP allocated in the unlicensed spectrum. The base station may transmit the supplemental system control information of the SBWP to the target UE when scheduling a primary BWP in a licensed spectrum, so that the target UE can perform transmission configuration for the SBWP according to the supplemental system control information, and then the base station can schedule the target UE on the SBWP. In the present disclosure, the supplemental system control information about the SBWP may be carried by the primary BWP and transmitted to the target UE, thereby achieving flexible configuration of the unlicensed spectrum resource through abundant control information transmission resources in the licensed spectrum, avoiding a disadvantage that fine control of the unlicensed spectrum resources cannot be achieved due to planning and activating/deactivating of a CC through an unlicensed spectrum, enabling the base station to flexibly configure the SBWP for the target UE according to the valid transmission resource detected in the unlicensed spectrum, and improving the availability of the unlicensed spectrum resources. Information can also be transmitted through the SBWP while being transmitted through the primary BWP, thus improving the efficiency of information transmission between the base station and the target UE, and improving the user experience in the use of a 5G NR network device.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting information that is applicable to a base station, the method comprising:
   determining supplemental system control information for target user equipment (UE) to communicate in an unlicensed spectrum, where the supplemental system control information is configured to inform the target UE of configuration information of a supplemental bandwidth part (SBWP) allocated in the unlicensed spectrum;
   sending the supplemental system control information to the target UE through a primary bandwidth part (BWP), where the primary BWP is a BWP allocated in a licensed spectrum by the base station to the target UE; and
   scheduling the target UE on the primary BWP and the SBWP to perform information transmission.

2. The method of claim 1, wherein:
   determining the supplemental system control information for the target UE to communicate in the unlicensed spectrum further comprises
   determining the supplemental system control information for the target UE to communicate in the unlicensed spectrum according to a preset SBWP configuration rule, and
   the preset SBWP configuration rule includes allocating a BWP resource for the target UE:
   allocating a preset specified channel in the unlicensed spectrum; or
   allocating according to a historical scheduling record of the target UE in the unlicensed spectrum.

3. The method of claim 2, wherein determining the supplemental system control information further comprises:
   determining carrier location information of scheduling information of the SBWP; and
   determining the supplemental system control information based on a time-frequency resource range of the SBWP and the carrier location information of the scheduling information.

4. The method of claim 1, wherein determining the supplemental system control information for the target UE to communicate in the unlicensed spectrum further comprises:
   monitoring a valid transmission resource that meets a preset channel quality condition in the unlicensed spectrum;
   allocating the SBWP for the target UE according to the valid transmission resource; and
   determining the supplemental system control information according to a time-frequency resource range of the SBWP.

5. The method of claim 4, wherein monitoring the valid transmission resource that meets the preset channel quality condition in the unlicensed spectrum further comprises:
   determining a target frequency range supported by the target UE in the unlicensed spectrum; and
   monitoring the valid transmission resource that meets the preset channel quality condition in the target frequency range.

6. The method of claim 5, wherein monitoring the valid transmission resource that meets the preset channel quality condition in the target frequency range further comprises:
   monitoring channel quality information of a preset channel according to a preset channel bandwidth in the target frequency range; and
   determining the preset channel as a valid channel when the channel quality information is greater than or equal to a preset channel quality threshold.

7. The method of claim 6, wherein allocating the SBWP for the target UE according to the valid transmission resource further comprises:
   determining a time domain resource range allocated to the target UE on the valid channel; and
   determining the time-frequency resource range of the SBWP allocated to the target UE based on the time domain resource range and the preset channel bandwidth of the valid channel.

8. The method of claim 4, wherein monitoring the valid transmission resource that meets the preset channel quality condition in the unlicensed spectrum further comprises:
   monitoring a full-frequency valid transmission resource that meets the preset channel quality condition on the whole unlicensed spectrum;
   determining a target frequency range supported by the target UE in the unlicensed spectrum; and determining the valid transmission resource according to a coincidence frequency range of the full-frequency valid transmission resource and the target frequency range.

9. The method of claim 4, wherein allocating the SBWP for the target UE according to the valid transmission resource further comprises:
determining preset reference information of the target UE, where the preset reference information is configured to assess whether the SBWP is required to be allocated to the target UE in the unlicensed spectrum; and
allocating the SBWP for the target UE according to the valid transmission resource in response to that the preset reference information meets a preset reference condition.

10. The method of claim 9, wherein:
the preset reference information comprises at least one of a volume of services to be transmitted, types of services to be transmitted, or power consumption state information of the target UE, and
the preset reference condition includes at least one of following:
the volume of services to be transmitted exceeding a preset service volume threshold;
the types of the services to be transmitted comprising a preset service type; or
the power consumption state information not exceeding a preset power consumption threshold.

11. The method of claim 1, wherein sending the supplemental system control information to the target UE through the primary BWP further comprises:
loading the supplemental system control information to a control resource set of the primary BWP; and
transmitting the supplemental system control information to the target UE through the control resource set of the primary BWP.

12. The method of claim 1, wherein scheduling the target UE on the primary BWP and the SBWP to perform information transmission further comprises:
determining scheduling information of the SBWP, where the scheduling information is configured to inform the target UE of configuration information of uplink and downlink transmission resources in the SBWP;
sending the scheduling information of the SBWP to the target UE; and
scheduling transmission resources of the primary BWP and the SBWP to perform information transmission based on preset scheduling information of the primary BWP and the scheduling information of the SBWP.

13. The method of claim 12, wherein sending the scheduling information of the SBWP to the target UE further comprises at least one of the following:
setting the scheduling information of the SBWP into a control information transmission resource of the primary BWP, and sending the scheduling information to the target UE through the primary BWP;
setting the scheduling information of the SBWP into a supplemental control information transmission resource of the SBWP, and sending the scheduling information to the target UE through the SBWP;
setting a part of the scheduling information of the SBWP into the primary BWP, and setting the rest of the scheduling information of the SBWP into the SBWP; or
transmitting a part of the scheduling information of the SBWP to the target UE through the primary BWP, and transmitting the rest of the scheduling information of the SBWP to the target UE through a supplemental control information transmission resource of the SBWP.

14. The method of claim 1, further comprising:
acquiring channel quality information of a configured SBWP; and
transmitting scheduling-cancel configuration information to the target UE through the primary BWP when the channel quality information of the configured SBWP is lower than a preset threshold, where the scheduling-cancel configuration information is configured to inform the target UE of information about scheduling cancellation of the configured SBWP.

15. The method of claim 1, further comprising:
allocating a newly added SBWP for the target UE according to a new valid transmission resource when new valid transmission resource is detected in the unlicensed spectrum; and
transmitting newly added scheduling configuration information to the target UE through the primary BWP, where the newly added scheduling configuration information is configured to inform the target UE to add transmission configuration for the newly added SBWP.

16. The method of claim 1, wherein, before determining the supplemental system control information for the target UE to communicate in the unlicensed spectrum, the method further comprises:
receiving preset reference indication information from the target UE, where the preset reference indication information is configured to determine whether the target UE supports an SBWP function presently, and
wherein determining the supplemental system control information for the target UE to communicate in the unlicensed spectrum further comprises:
determining the supplemental system control information for the target UE to communicate in the unlicensed spectrum when determining according to the preset reference indication information that the target UE supports the SBWP function presently.

17. The method of claim 16, further comprising:
determining whether an SBWP resource allocation function is presently supported based on at least one of a service carrying condition and power consumption state information of the base station; and
transmitting, to the target UE, preset control information for instructing the target UE to stop reporting the reference indication information when the SBWP resource allocation function is not supported presently.

18. A method for transmitting information that is applicable to user equipment (UE), comprising:
acquiring supplemental system control information from a primary bandwidth part (BWP) scheduled by a base station, where the primary BWP is a BWP configured in a licensed spectrum by the base station for the UE;
acquiring scheduling information of a supplemental bandwidth part (SBWP);
completing transmission configuration for the SBWP in an unlicensed spectrum according to the supplemental system control information and the scheduling information of the SBWP; and
transmitting/receiving information to/from the base station through the primary BWP and the SBWP.

19. The method of claim 18, wherein:
the supplemental system control information comprises carrier location information of the scheduling information of the SBWP, and acquiring the scheduling information of the SBWP comprises at least one of the following:
  acquiring the scheduling information of the SBWP from a control information transmission resource of the primary BWP according to the carrier location information;
  acquiring a part of the scheduling information of the SBWP from the primary BWP according to the carrier location information and acquiring the rest of the scheduling information of the SBWP from a supplemental control information transmission resource of the SBWP to acquire the scheduling information of the SBWP completely; or
  acquiring the scheduling information of the SBWP from a supplemental control information transmission resource of the SBWP according to the carrier location information.

20. The method of claim 18, further comprising:
  acquiring scheduling-cancel configuration information from the primary BWP scheduled by the base station, where the scheduling-cancel configuration information is configured to inform the UE of information about scheduling cancellation of a configured SBWP; and
  canceling information transmission on the configured SBWP based on the scheduling-cancel configuration information.

21. The method of claim 20, wherein canceling information transmission on the configured SBWP further comprises:
  canceling the transmission configuration of the SBWP when the configured SBWP is not scheduled; or
  stopping the information transmission when the UE is performing the information transmission on the configured SBWP.

22. The method of claim 18, further comprising:
  acquiring newly added scheduling configuration information from the primary BWP scheduled by the base station, where the newly added scheduling configuration information is configured to inform the UE of adding transmission configuration for a newly added SBWP; and
  completing the transmission configuration for the newly added SBWP according to the newly added scheduling configuration information and transmitting information through the newly added SBWP.

23. The method of claim 18, wherein, before acquiring the supplemental system control information from the primary BWP scheduled by the base station, the method further comprises:
  sending preset reference indication information to the base station, where the preset reference indication information is configured to determine whether the UE supports an SBWP function presently.

24. The method of claim 23, further comprising:
  stopping reporting the reference indication information to the base station when preset control information sent by the base station is received.

25. A base station, comprising:
  a processor; and
  a memory configured to store instructions executable by the processor that cause the processor to
  implement the method of claim 1.

26. User equipment, comprising:
  a processor; and
  a memory configured to store instructions executable by the processor,
  wherein the processor is configured to:
    acquire supplemental system control information from a primary bandwidth part (BWP) scheduled by a base station, where the primary BWP is a BWP configured in a licensed spectrum by the base station for the UE;
    acquire scheduling information of a supplemental bandwidth part (SBWP);
    complete transmission configuration for the SBWP in an unlicensed spectrum according to the supplemental system control information and the scheduling information of the SBWP; and
    send/receive information to/from the base station through the primary BWP and the SBWP.

* * * * *